United States Patent
Fukuma et al.

(10) Patent No.: US 12,552,317 B2
(45) Date of Patent: Feb. 17, 2026

(54) INFORMATION PROCESSING DEVICE AND INFORMATION PROCESSING METHOD

(71) Applicant: SONY GROUP CORPORATION, Tokyo (JP)

(72) Inventors: Yohei Fukuma, Tokyo (JP); Ken Otsuka, Tokyo (JP); Naomasa Takahashi, Tokyo (JP); Toru Nagara, Tokyo (JP); Hiroshi Takeuchi, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 581 days.

(21) Appl. No.: 17/439,248

(22) PCT Filed: Mar. 4, 2020

(86) PCT No.: PCT/JP2020/009042
§ 371 (c)(1),
(2) Date: Sep. 14, 2021

(87) PCT Pub. No.: WO2020/195625
PCT Pub. Date: Oct. 1, 2020

(65) Prior Publication Data
US 2022/0144172 A1    May 12, 2022

(30) Foreign Application Priority Data
Mar. 25, 2019    (JP) ................ 2019-057468

(51) Int. Cl.
*B60R 1/20*    (2022.01)
*B60K 35/00*    (2024.01)
(Continued)

(52) U.S. Cl.
CPC ............... *B60R 1/20* (2022.01); *B60K 35/10* (2024.01); *B60K 35/23* (2024.01); *B60K 35/28* (2024.01);
(Continued)

(58) Field of Classification Search
CPC ........ G06F 3/013; G06F 3/011; G06F 3/0416; G03B 21/62; G03B 21/14; G03B 21/00;
(Continued)

(56) References Cited

U.S. PATENT DOCUMENTS 9,513,744 B2 * 12/2016 Pryor ................ G01C 21/3664
10,059,238 B1    8/2018 Salter et al.
(Continued)

FOREIGN PATENT DOCUMENTS

CN    107848419 A    3/2018
CN    108473054 A    8/2018
(Continued)

OTHER PUBLICATIONS

Minoru Fukuda et al (an English-translated version of JP2013067209A (Year: 2013 ).*
(Continued)

*Primary Examiner* — Cuong H Nguyen
(74) *Attorney, Agent, or Firm* — CHIP LAW GROUP

(57) ABSTRACT

An information processing device includes an acquisition unit that acquires a detection result on light outside a mobile object, an analyzer that determines a position of projection of content in the mobile object based on the detection result on the light outside the mobile object, and a display controller that performs control on projection of the content onto the determined position of projection.

15 Claims, 34 Drawing Sheets

(51) Int. Cl.
*B60K 35/10* (2024.01)
*B60K 35/23* (2024.01)
*B60K 35/28* (2024.01)
*B60K 35/53* (2024.01)
*B60K 35/81* (2024.01)
*G06F 3/01* (2006.01)

(52) U.S. Cl.
CPC .............. *B60K 35/53* (2024.01); *B60K 35/81* (2024.01); *G06F 3/013* (2013.01); *B60K 2360/149* (2024.01); *B60K 2360/27* (2024.01); *B60K 2360/334* (2024.01)

(58) Field of Classification Search
CPC ...... B60R 1/20; B60K 35/00; B60K 2360/27; B60K 35/10; B60K 35/81; B60K 2360/149; B60K 2360/1523; B60K 2360/33; G09G 2380/10
USPC ................... 345/592, 594; 354/173; 352/133
See application file for complete search history.

(56) References Cited

U.S. PATENT DOCUMENTS

| | | | | |
|---|---|---|---|---|
| 11,731,512 | B2* | 8/2023 | Helot | G06F 3/013 345/592 |
| 2005/0046584 | A1* | 3/2005 | Breed | G06F 3/0237 340/13.31 |
| 2015/0281418 | A1 | 10/2015 | Aizawa | |
| 2016/0170487 | A1* | 6/2016 | Saisho | G01C 21/3697 345/156 |
| 2016/0193921 | A1* | 7/2016 | Suzuki | G08G 1/166 701/36 |
| 2018/0147985 | A1* | 5/2018 | Brown | B60R 1/29 |
| 2019/0025580 | A1 | 1/2019 | Nagano et al. | |

FOREIGN PATENT DOCUMENTS

| | | | | |
|---|---|---|---|---|
| CN | 108473055 A | | 8/2018 | |
| CN | 108803877 A | * | 11/2018 | ............. G06F 3/011 |
| CN | 107107759 B | * | 3/2019 | ............. B60K 35/81 |
| CN | 208896962 U | | 5/2019 | |
| DE | 112014004359 T5 | * | 6/2016 | ............. B60K 35/00 |
| DE | 202018103005 U1 | | 7/2018 | |
| EP | 3031655 A1 | * | 6/2016 | ............. B60K 35/00 |
| JP | 2013067209 A | * | 4/2013 | |
| JP | 2015-184642 A | | 10/2015 | |
| JP | 2017-193190 A | | 10/2017 | |
| JP | 2018-526258 A | | 9/2018 | |
| KR | 10-2018-0015669 A | | 2/2018 | |
| TW | 201710113 A | | 3/2017 | |
| WO | 2016/196544 A1 | | 12/2016 | |
| WO | 2017/134865 A1 | | 8/2017 | |
| WO | WO-2019211039 A1 | * | 11/2019 | ............. B60K 35/00 |
| WO | WO-2020195625 A1 | * | 10/2020 | ............. B60K 35/53 |

OTHER PUBLICATIONS

He Z, CN-108803877-A (an English-translated version) (Year: 2018).*

Rao, Qing, et al. "AR-IVI—Implementation of in-vehicle augmented reality." 2014 IEEE international symposium on mixed and augmented reality (ISMAR). IEEE, (Year: 2014).*

Omerustaoglu, Furkan, C. Okan Sakar, and Gorkem Kar. "Distracted driver detection by combining in-vehicle and image data using deep learning." Applied Soft Computing 96: 106657. (Year: 2020).*

International Search Report and Written Opinion of PCT Application No. PCT/JP2020/009042, issued on Jun. 2, 2020, 09 pages of ISRWO.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/009042 filed on Mar. 4, 2020, which claims priority benefit of Japanese Patent Application No. JP 2019-057468 filed in the Japan Patent Office on Mar. 25, 2019. Each of the above-referenced applications is hereby incorporated herein by reference in its entirety.

FIELD

The present disclosure relates to an information processing device, an information processing method and an information processing program.

BACKGROUND

In order to provide a comfortable viewing environment to a person on a mobile object, an image display device is sometimes set in the mobile object. For example, Patent Literature 1 discloses an image display device that displays an image of a rear view, a rear side view, or the like, of the vehicle that is captured by a vehicle-mounted camera in the passenger compartment.

CITATION LIST

Patent Literature

Patent Literature 1: JP 2017-193190 A

SUMMARY

Technical Problem

Simply setting an image display device in a mobile object does not necessarily provide a preferable viewing environment to a person on a mobile object. For example, the inside of a mobile object tends to be narrow and it is difficult to set a large display. In addition, because a mobile object is mobile, the environment in the mobile object varies from time to time. For this reason, a preferable viewing environment at a time point is not necessarily a preferable viewing environment at another time point.

The present disclosure thus proposes an information processing device, an information processing method, and an information processing program that make it possible to provide a preferable viewing environment to a person on a mobile object.

Solution to Problem

To solve the above problem, an information processing device according to the present disclosure includes: an acquisition unit configured to acquire a detection result on light outside a mobile object; an analyzer configured to determine a position of projection of content in the mobile object based on the detection result on the light outside the mobile object; and a display controller configured to perform control on projection of the content onto the determined position of projection.

DESCRIPTION OF EMBODIMENTS

Figure 1:
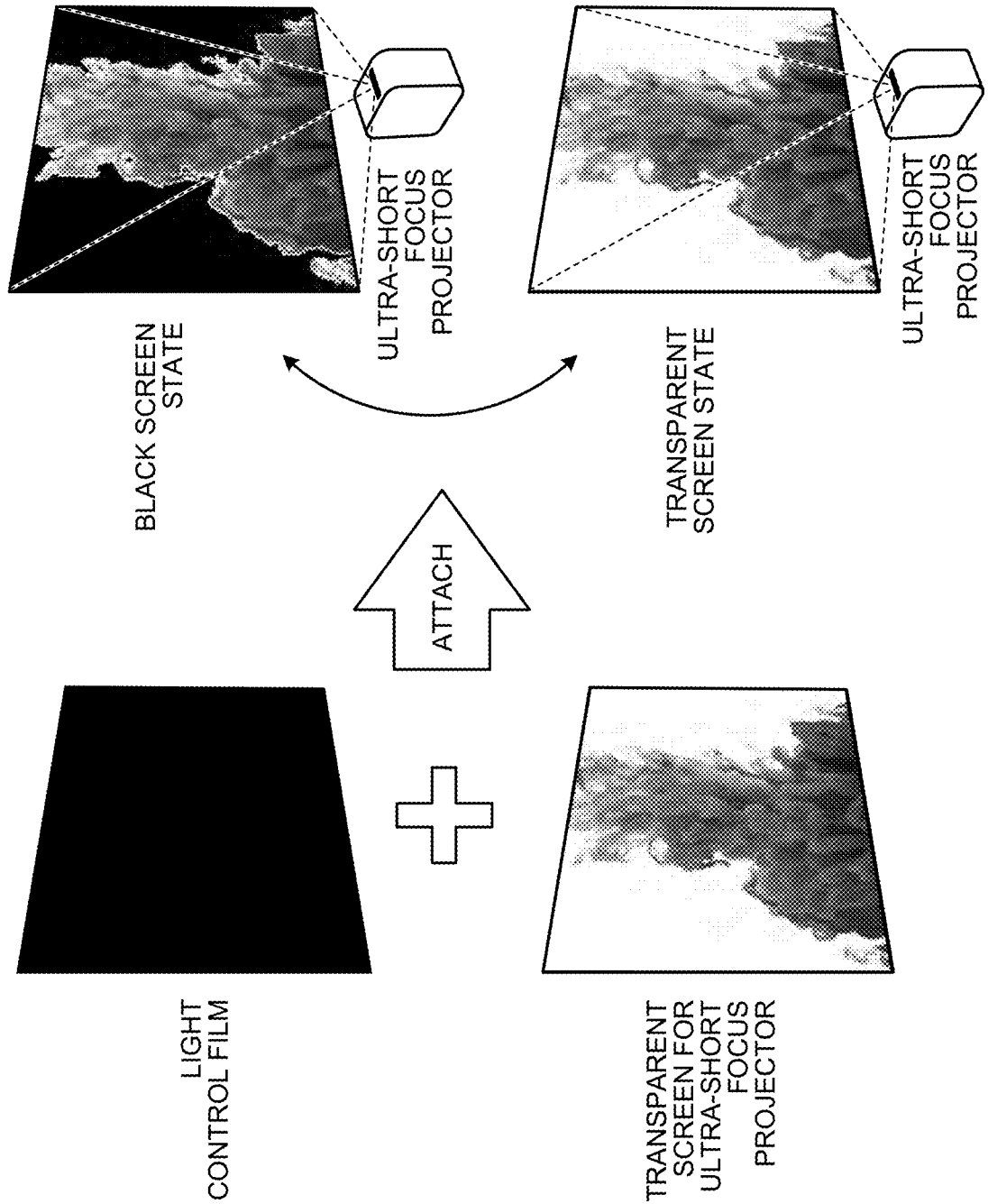
FIG. 1 is a diagram for describing an overview of the present embodiment.

An embodiment of the disclosure will be described in detail below based on the drawings. In each embodiment below, the same reference numerals are assigned to the same parts and thus redundant description will be omitted.

In the description and drawings, multiple components having substantially the same functional configurations may be distinguished from one another by assigning different numbers to the end of the same reference numbers. For example, as presented by detection devices 101, 102 and 103, multiple configurations having substantially the same functional configurations are distinguished from one another as required. Note that, when it is not particularly required to distinguish multiple components having substantially the same functional configurations from one another, only the same reference numerals are assigned. For example, when it is not particularly required to distinguish the detection devices 101, 102 and 103 from one another, they are simply referred to as detection devices 10.

The disclosure will be described according to the following order of items.

1. Introduction
2. Configuration of Image Display System
   2-1. General Configuration of Image Display System
   2-2. Configuration of Detection Device
   2-3. Configuration of Information Processing Device
   2-4. Configuration of Image Display Device
   2-5. Example of setting Screen
   2-6. Example of setting Projector
3. Example of Operation of Image Display System
   3-1. System Configuration used for Description
   3-2. Process Flow
   3-3. Light-control/projection control based on Sensor Information
   3-4. Light-control/projection control in consideration of Safety
4. Specific Example of Process of Light-control/projection control in consideration of Safety
   4-1. Overview
   4-2. Process Flow
   4-3. Effect of Example
5. Modification
   5-1. Modification on System Configuration
   5-2. Other Modifications
6. Summary 1. Introduction Conventionally, a non-transmissive display or screen is often set in a mobile object, such as an automobile. For example, when automobiles are taken as an example, a center console monitor, a ceiling flip down monitor, a seat back monitor, and a head rest embedded monitor are set.

Such conventional non-transmissive displays and screens, however, have a problem in that the position and screen size are fixed and accordingly the place where a display or a screen can be arranged is restricted or a problem in that the view is blocked depending on the place of arrangement and accordingly safety lowers. Furthermore, looking up close tends to induce motion sickness.

Thus, in the present embodiment, an image display system obtained by combining a transparent screen, a light control film, and a projection device is set in a mobile object. FIG. 1 is a diagram for describing an overview of the present embodiment. In the present embodiment, a hybrid screen obtained by attaching a light control film to a transparent screen (for example, a transparent screen for ultra-short focus projectors) serves as a screen on which content is displayed. Light transmittance of the light control film is adjustable by adjusting the voltage to be applied, or the like. Adjusting the transmittance of the light control film enables the hybrid screen to turn into a transmitting state (a transparent screen state illustrated in FIG. 1) or a not-transmitting state (a black screen state illustrated in FIG. 1). A hybrid screen with the not-transmitting state is one type of transparent screen.

Using a hybrid screen as the screen that is set in the mobile object enables both transmission and high-contrast video. For this reason, the image display system of the present embodiment is able to present various effects to a person on the mobile object. For example, because the screen is transparent, the image display system of the present embodiment is able to present information in any arrangement or size to the person on board. In addition, the screen of the present embodiment is able to switch between being transmitting and being not transmitting instantaneously. For this reason, the image display system of the present embodiment is able to display information even in a place where the arrangement is not enabled because the view is blocked. Furthermore, because the image display system of the present embodiment is able to adjust transparency using the light control film in combination with various sensors, it is possible to ensure a required view and shield the view as appropriate. Furthermore, because the image display system according to the present embodiment is able to mix an approximate view and a distant view by controlling transparency, an effect of reducing motion sickness of the person on the mobile object can be expected.

The screen of the present embodiment may be configured movably or detachably. The screen of the present embodiment may be configured such that the screen can be taken out or can be housed in an arm rest of a chair. Projection may be combined with a pan-tilt unit as required such that the direction of projection is changeable. This makes it possible to provide a further preferable viewing environment to the person on the mobile object.

The overview of the embodiment has been described above and an image display system 1 of the embodiment will be described in detail below.

2. Configuration of Image Display System

The image display system 1 includes the hybrid screen that is set in the mobile object and is capable of providing information to the person on the mobile object. The idea of a person on board includes not only a passenger but also a driver. As described above, the hybrid screen is one type of transparent screen. When the hybrid screen enters the transmitting state (transparent state), the user is able to view the opposite side of the screen in between. The image display system 1 is set in, for example, a mobile object, such as an automobile, and provides a preferable viewing environment to the person on the mobile object (sometimes simply referred to as the user below).

The mobile object in which the image display system 1 is set may be a mobile object that travels terrestrially (on the land in the narrow sense) (for example, a vehicle, such as an automobile, a bus, a truck, a motorcycle, a bicycle, a train or a linear motor car) or a mobile object that travels underground (for example, through a tunnel) (for example, a subway car).

The mobile object in which the image display system 1 is set may be a mobile object that travels on the water (for example, a ship, such as a passenger ship, a cargo ship or a hovercraft) or a mobile object that travels under water (for example, a submersible ship, such as a submersible, a submarine or an unmanned underwater vehicle).

The mobile object in which the image display system 1 is set may be a mobile object that travels under the atmosphere (for example, an aircraft, such as an airplane or an airship) or a mobile object that travels above the atmosphere (for example, an artificial planet, such as a spaceship or a space station).

The image display system 1 is set in the mobile object according to the following description, and the image display system 1 itself can be regarded as a mobile object.

The mobile object in which the image display system 1 is set is, for example, a car. A car is a mobile object that travels terrestrially (on the land in the narrow sense) and is typically, an automobile. Needless to say, the car is not limited to an automobile and may be, for example, a mobile object other than automobiles, such as a bus, truck, a motor cycle, a bicycle, a train, or a linear motor car.

A configuration example of the image display system 1 will be described specifically.

2-1. General Configuration of Image Display System

Figure 2:
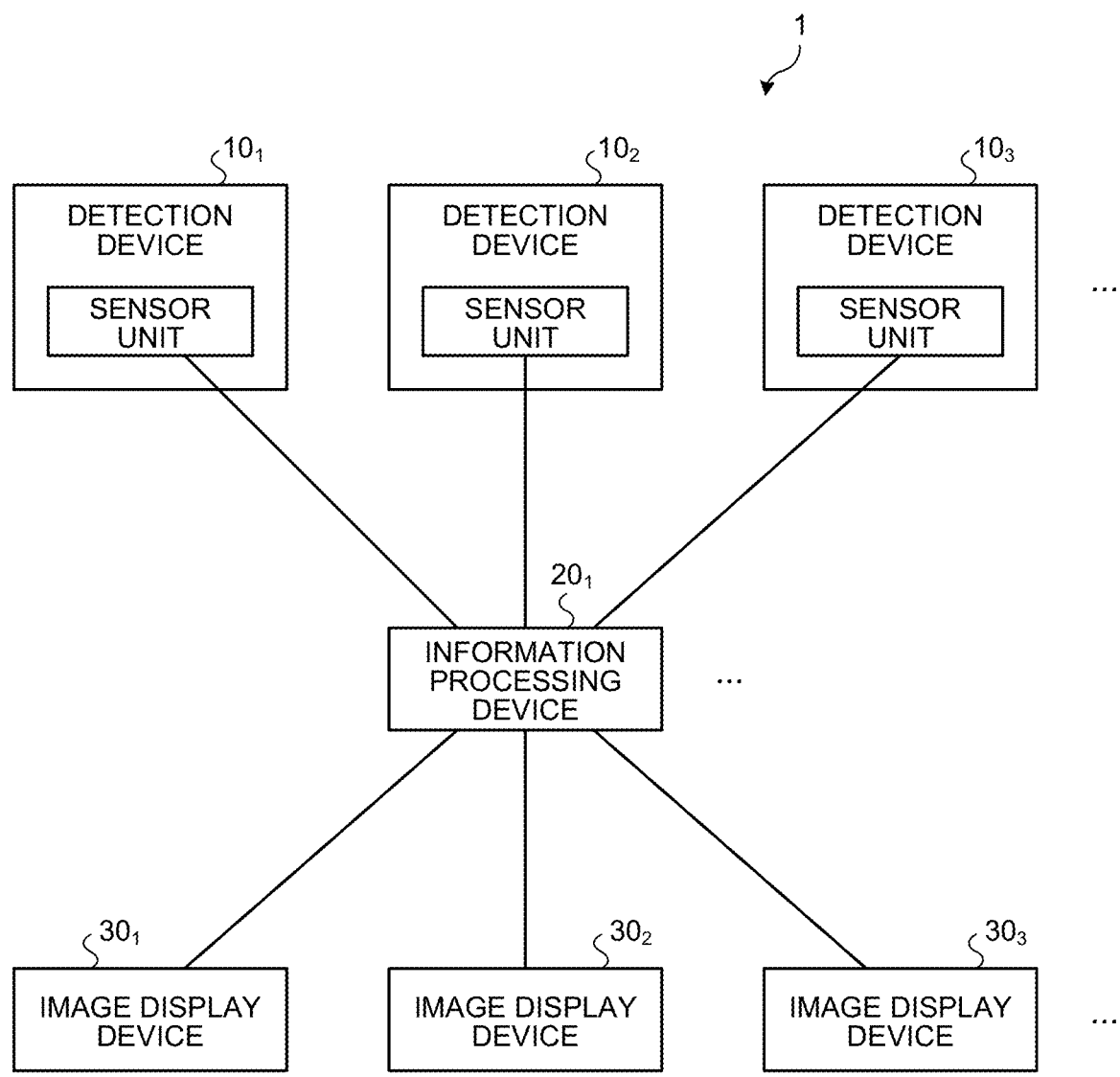
FIG. 2 is a diagram illustrating a configuration example of an image display system according to an embodiment of the disclosure.

FIG. 2 is a diagram illustrating a configuration example of the image display system 1 according to the embodiment of the disclosure.

As illustrated in FIG. 2, the image display system 1 includes a detection device 10, an information processing device 20, and an image display device 30. The image display system 1 may include a plurality of the detection devices 10, the information processing devices 20, and the image display devices 30 or include the single detection device 10, the single information processing device 20, and the single image display device 30.

In the example in FIG. 2, the image display system 1 includes the detection devices 101, 102, 103, etc., as the detection device 10. The image display system 1 includes an information processing device 201, etc., as the information processing device 20. The image display system 1 includes image display devices 301, 302, 303, etc., as the image display device 30.

The devices in the drawings may be considered devices in a logical sense. In other words, part of the devices in the drawing may be realized by a virtual machine (VM), a container, Docker, or the like, and they may be implemented on physically the same hardware.

As for each device of which the image display system 1 consists, all the devices need not necessarily be set in the mobile object. For example, any one or both of the detection device 10 and the information processing device 20 may be set outside the mobile object, transmit information to another device via communication, and control another device. Needless to say, any one or both of the detection device 10 and the information processing device 20 may be set together with the image display device 30 in the mobile object. Any one or both of the detection device 10 and the information processing device 20 may be set in a given mobile object (a first mobile object) and control part of the devices of the image display system 1 (for example, the image display device 30) that is set in another mobile object (a second mobile object) via communication.

Figure 3:
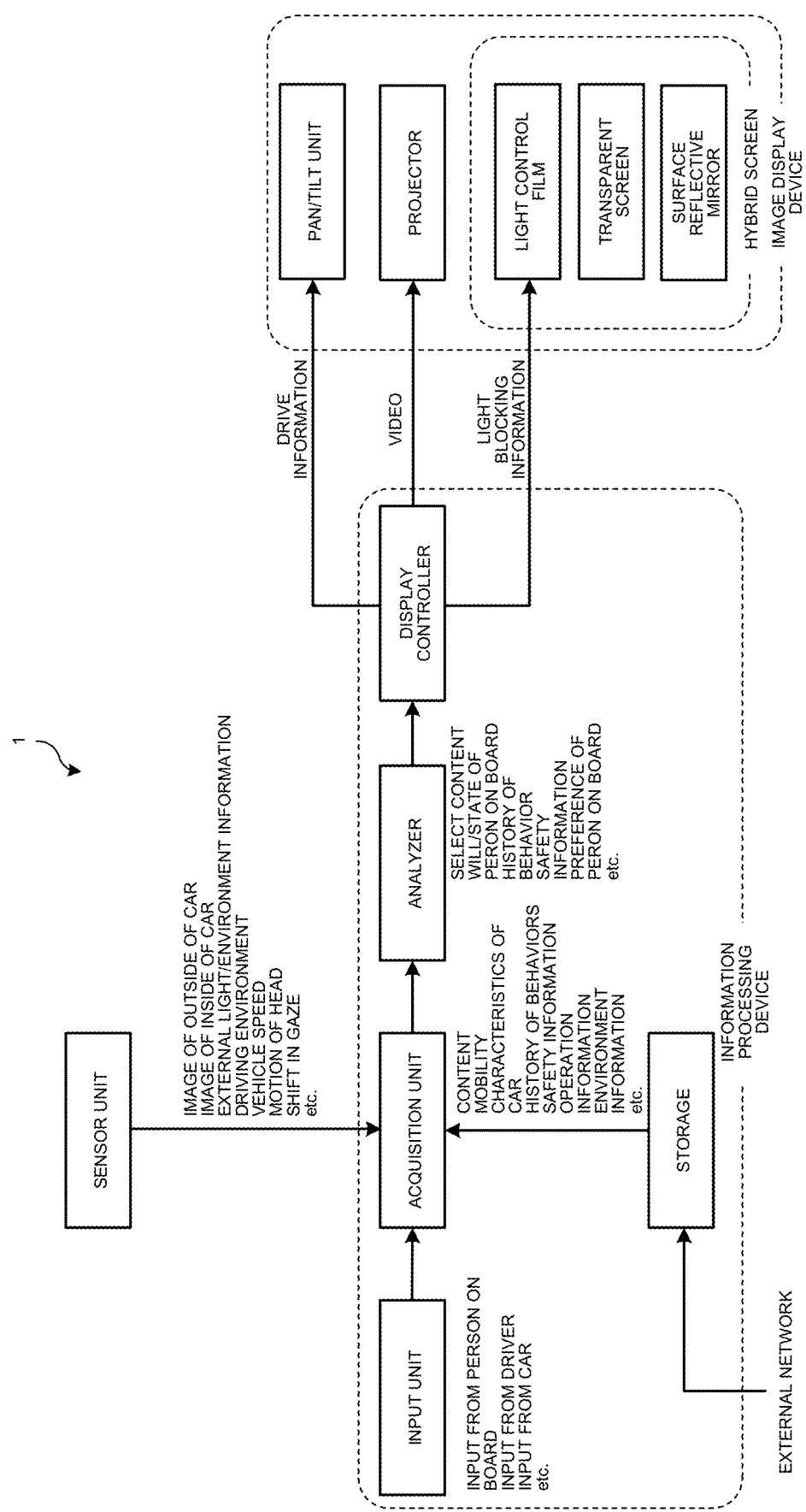
FIG. 3 is a diagram illustrating a specific configuration example of the image display system according to the embodiment of the disclosure.

FIG. 3 is a diagram illustrating a specific configuration example of the image display system 1 according to the embodiment of the disclosure. The configuration illustrated in FIG. 3 is an example only and the configuration of the image display system 1 is not limited to this example.

A configuration of each device of which the image display system 1 according to the embodiment consists will be described below. The configuration of each device presented below is an example only. The configuration of each device may be different from that of the following configuration.

2-2. Configuration of Detection Device

Figure 4:
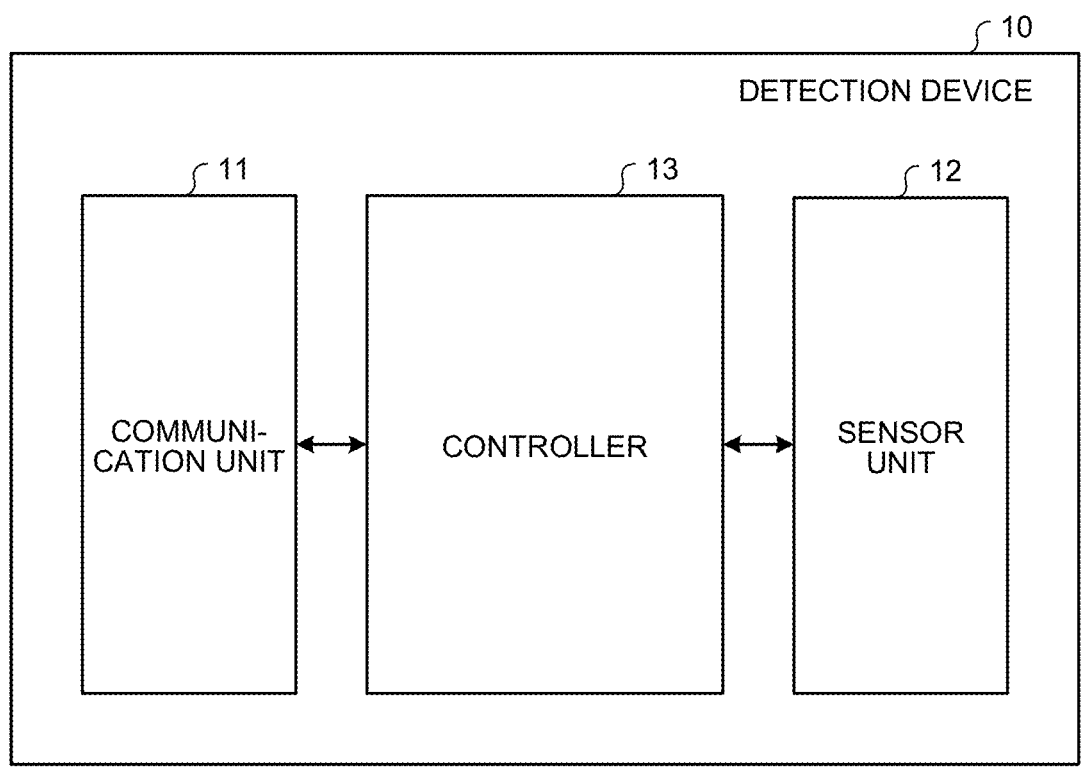
FIG. 4 is a diagram illustrating a configuration example of a detection device according to the embodiment of the disclosure.

FIG. 4 is a diagram illustrating a configuration example of the detection device 10 according to the embodiment of the disclosure. The detection device 10 is a device that detects various states of the inside or the outside of the mobile object. For example, the detection device 10 is a sensor device (sensor system), such as a camera (image sensor). The detection device may be a sensor device (sensor system)

that is attached to the mobile object (for example, an automobile), such as a mill wave radar or an ultrasound sensor.

The detection device 10 includes a communication unit 11, a sensor unit 12, and a controller 13. The configuration illustrated in FIG. 4 is a functional configuration and the hardware configuration may differ from this. The functions of the detection device 10 may be implemented as multiple physically separated components in a distributed manner. For example, the detection device 10 may consist of multiple sensor devices.

The communication unit 11 is a communication interface for communicating with another device. The communication unit 11 may be a network interface or may be a device connection interface. For example, the communication unit 11 may be a LAN (Local Area Network) interface, such as an NIC (network interface card), or a USB (Universal Serial Bus) interface consisting of a USB host controller, an USB port, etc. The communication unit 11 may be a wired interface or a wireless interface. The communication unit 11 functions as a communication unit of the detection device 10. The communication unit 11 communicates with the information processing device 20 according to control of the controller 13.

The sensor unit 12 is a device that detects a state of the inside or the outside of the mobile object. For example, the sensor unit 12 includes an illuminance sensor, a pressure sensor, an acceleration sensor, and a position sensor. The sensor unit 12 may include an imaging device (image sensor), a microphone (sound sensor), a ToF (Time of Flight) sensor, or a depth sensor. The imaging device may be a stereo camera. The sensor unit may be a sensor that is previously attached to the car, such as an ultrasound sensor (for example, a corner sensor), a speed sensor, a rain detection sensor or an impact sensing sensor. The sensor unit 12 may be a sensor that senses a state of the image display device 30. For example, the sensor unit 12 may be a touch sensor that senses whether the screen is touched. The sensor unit 12 detects, for example, information, such as an image of the inside of the car, an image of the outside of the car, external light/environment information, a driving environment, vehicle speed, motion of the head of the user, and shift in gaze of the user.

The controller 13 is a controller that controls each unit of the detection device 10. The controller 13 is implemented by a processor, such as a CPU (Central Processing Unit) or a MPU (Micro Processing Unit). For example, the controller 13 is implemented by the processor by executing various programs that are stored in a storage device in the detection device 10 using a RAM (Random Access Memory), or the like, as a work area. The controller 13 may be implemented by an integrated circuit, such as an ASIC (Application Specific Integrated Circuit) or a FPGA (Field Programmable Gate Array). A CPU, a MPU, an ASIC and a FPGA can be all regarded as controllers.

2-3. Configuration of Information Processing Device

Figure 5:
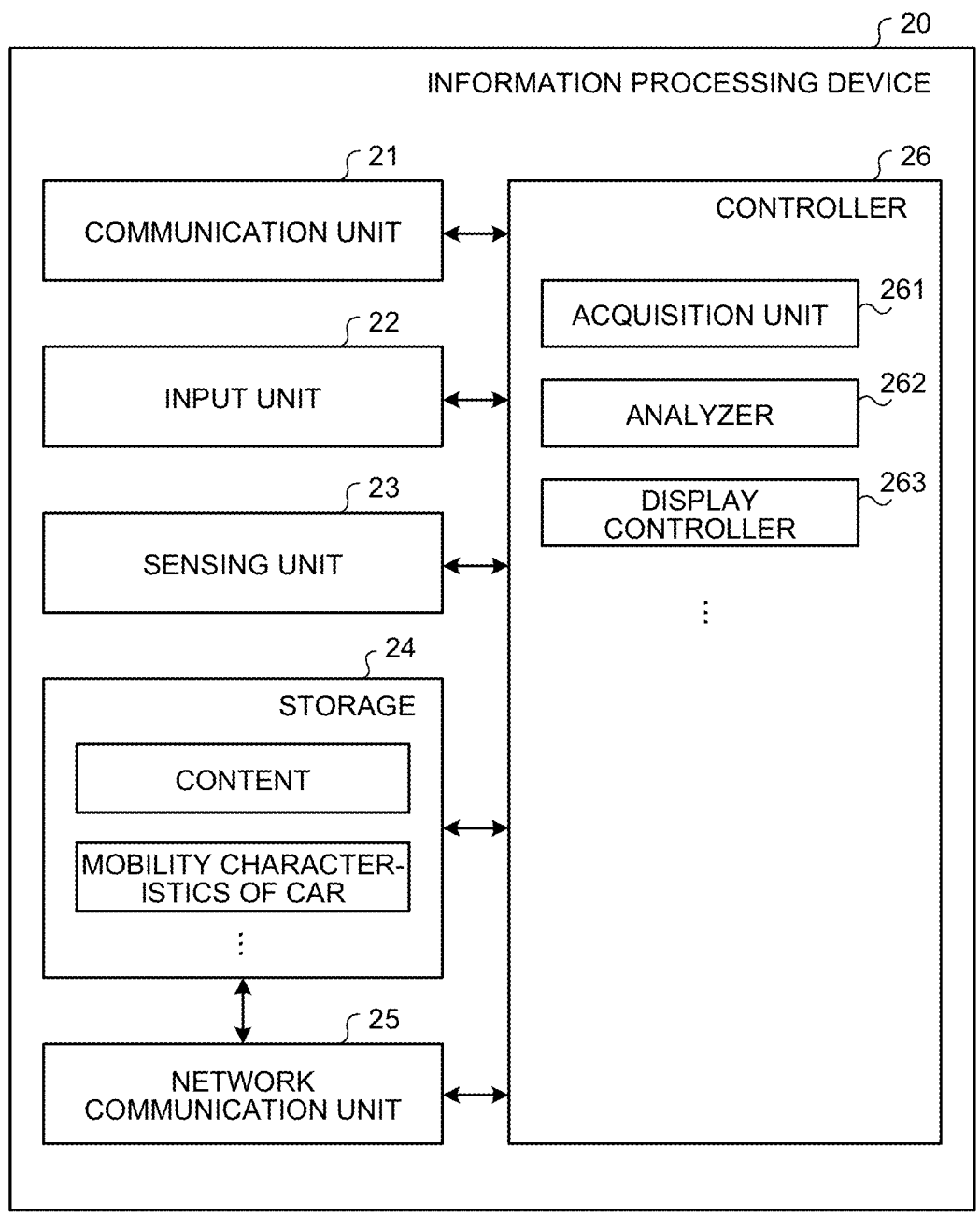
FIG. 5 is a diagram illustrating a configuration example of an information processing device according to the embodiment of the disclosure.

A configuration of the information processing device 20 will be described. FIG. 5 is a diagram illustrating a configuration example of the information processing device 20 according to the embodiment of the disclosure. The information processing device 20 executes various types of processing for displaying an image on the screen that the image display device 30 includes.

The information processing device 20 can be regarded as part of the image display device 30. The information processing device 20 may be a processor for controlling the image display device 30. Needless to say, the information processing device 20 may be a device outside the image display device 30.

The information processing device 20 includes a communication unit 21, an input unit 22, a sensing unit 23, a storage 24, a network communication unit 25, and a controller 26. The configuration illustrated in FIG. 5 is a functional configuration and the hardware configuration may be different from this. The functions of the information processing device 20 may be implemented as multiple physically separated components in a distributed manner.

The communication unit 21 is a communication interface for communicating with other devices. The communication unit 21 may be a network interface or a device connection interface. For example, the communication unit 21 is a LAN interface, such as an NIC, or a USB interface consisting of a USB host controller, a USB port, etc. The communication unit 21 may be a wired interface or a wireless interface. The communication unit 21 functions as a communication unit of the information processing device 20. The communication unit 21 communicates with the detection device 10 according to control of the controller 26. The communication unit 21 is able to communicate with an external device, such as a smartphone or a tablet, and acquire various types of data, such as image data and audio data that is sent from the external device.

The input unit 22 is a user interface for communicating information with the user. For example, the input unit 22 is an operation device for the user to perform various operations, such as a keyboard, a mouse, an operation key, or a touch panel. The input unit 22 receives not only inputs from the person on board (including the driver) but also inputs from the mobile object (for example, a car). The input unit 22 functions as an input unit or an operation unit of the information processing device 20. Inputs of the person on board includes, for example, touch inputs to the hybrid screen to be described below and gestures of the user in the mobile object.

The sensing unit 23 is a device that detects a state of the inside or the outside of the mobile object. For example, the sensing unit 23 is a device that functions as an illuminance sensor, a pressure sensor, an acceleration sensor, and a position sensor. The sensing unit 23 may be a device functioning as an imaging device (image sensor), a microphone (sound sensor), a ToF (Time of Flight) sensor, or a depth sensor. The imaging device may be a stereo camera. The sensing unit 23 may be a sensor that is previously attached to the car, such as an ultrasound sensor (for example, a corner sensor), a speed sensor, a rain detection sensor or an impact detection sensor. The sensing unit 23 may be a sensor that senses a state of the image display device 30. For example, the sensing unit 23 may be a touch sensor that senses whether the screen is touched. The sensing unit 23 detects, for example, information, such as an image of the outside of the car, an image of the inside of the car, external light/environment information, a driving environment, a vehicle speed, motion of the head of the user, and shift in gaze of the user.

The storage 24 is a data readable and writable storage device, such as a DRAM (Dynamic Random Access Memory), a SRAM (Static Random Access Memory), a flash memory, or a hard disk. The storage 24 functions as a storage unit of the information processing device 20. The storage 24 stores, for example, information, such as content to be displayed on the screen that the image display device 30 includes, mobility characteristics of the car, a history of behaviors, safety information, operation information, and environment information.

The network communication unit 25 is a communication interface for communicating with another device. For example, the network communication unit 25 is a LAN interface, such as an NIC. The network communication unit 25 may be a wired interface or a wireless interface. The network communication unit 25 functions as a network communication unit of the information processing device 20. The network communication unit 25 communicates with another device according to control of the controller 26.

The controller 26 is a controller that controls each unit of the information processing device 20. The controller 26 is implemented, for example, by a processor, such as a CPU or a MPU. For example, the controller 26 is implemented by the processor by executing various programs that are stored in a storage device in the information processing device 20 using a RAM, or the like, as a work area. The controller 26 may be implemented by an integrated circuit, such as an ASIC or a FPGA. A CPU, a MPU, an ASIC and a FPGA can be all regarded as controllers.

As illustrated in FIG. 5, the controller 26 includes an acquisition unit 261, an analyzer 262, and a display controller 263. Each block (from the acquisition unit 261 to the display controller 263) of which the controller 26 consists is a functional block representing a function of the controller 26. These function blocks may be software blocks or hardware blocks. For example, each of the above-described function blocks may be a software module that is realized by software (including a microprogram) or a circuit block on a semiconductor chip (die). Needless to say, each of the functional blocks may be a processor or an integrated circuit. Any method of configuring functional blocks may be employed.

The controller 26 may be configured in a unit of function different from that of the above-described functional blocks. Each of the functional blocks of the controller 26 executes a given operation. For example, the analyzer 262 selects content, analyzes a will/state of the person on board, analyzes the history of behaviors, analyzes the safety information, and analyzes preference of the person on board. The display controller 263 transmits drive information, video information, light blocking information, etc., to the image display device 30, thereby controlling each unit of the image display device 30. Operations of each block (from the acquisition unit 261 to the display controller 263) of which the controller 26 consists will be described below.

2-4. Configuration of Image Display Device

Figure 6:
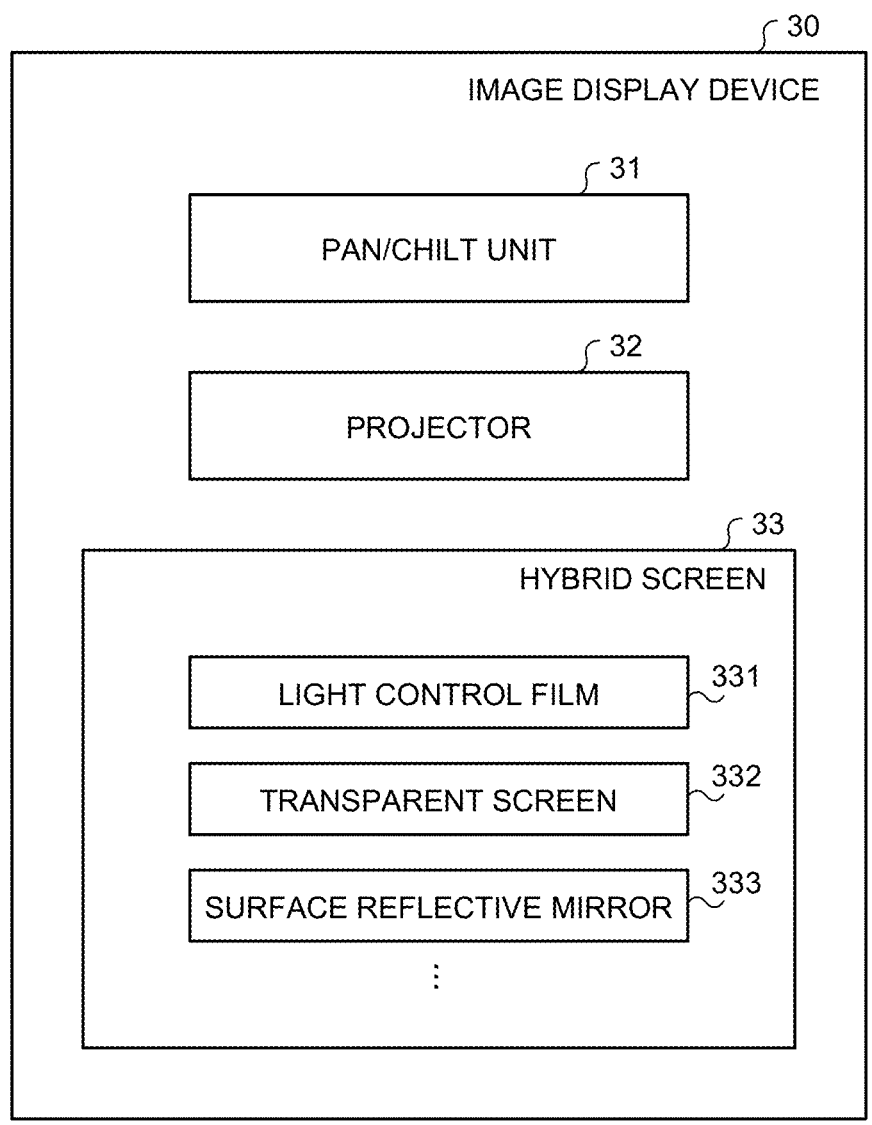
FIG. 6 is a diagram illustrating a configuration example of an image display device according to the embodiment of the disclosure.

A configuration of the image display device 30 will be described. FIG. 6 is a diagram illustrating a configuration example of the image display device 30 according to the embodiment of the disclosure. The image display device 30 displays various types of information to the user.

The image display device 30 includes a pan-tilt unit 31, a projector 32, and a hybrid screen 33. The configuration illustrated in FIG. 6 is a functional configuration and the hardware configuration may be different from this. The functions of the image display device 30 may be implemented as multiple physically separated components in a distributed manner. For example, the projector may include various optical functions, such as shift, pan, roll, pitch, zoom, focusing, and mirror reflection.

First of all, the configuration of the hybrid screen 33 is describe and thereafter configurations of the projector 32 and the pan-tilt unit 31 will be described.

Hybrid Screen

The hybrid screen 33 includes at least a transparent screen 332. The hybrid screen 33 is formed by combining the transparent screen 332 and any one or both of a light control film 331 and a surface reflective mirror 333. Before describing each unit of the hybrid screen 33, some configuration examples of the hybrid screen 33 will be described.

First Configuration Example of Hybrid Screen

Figure 7:
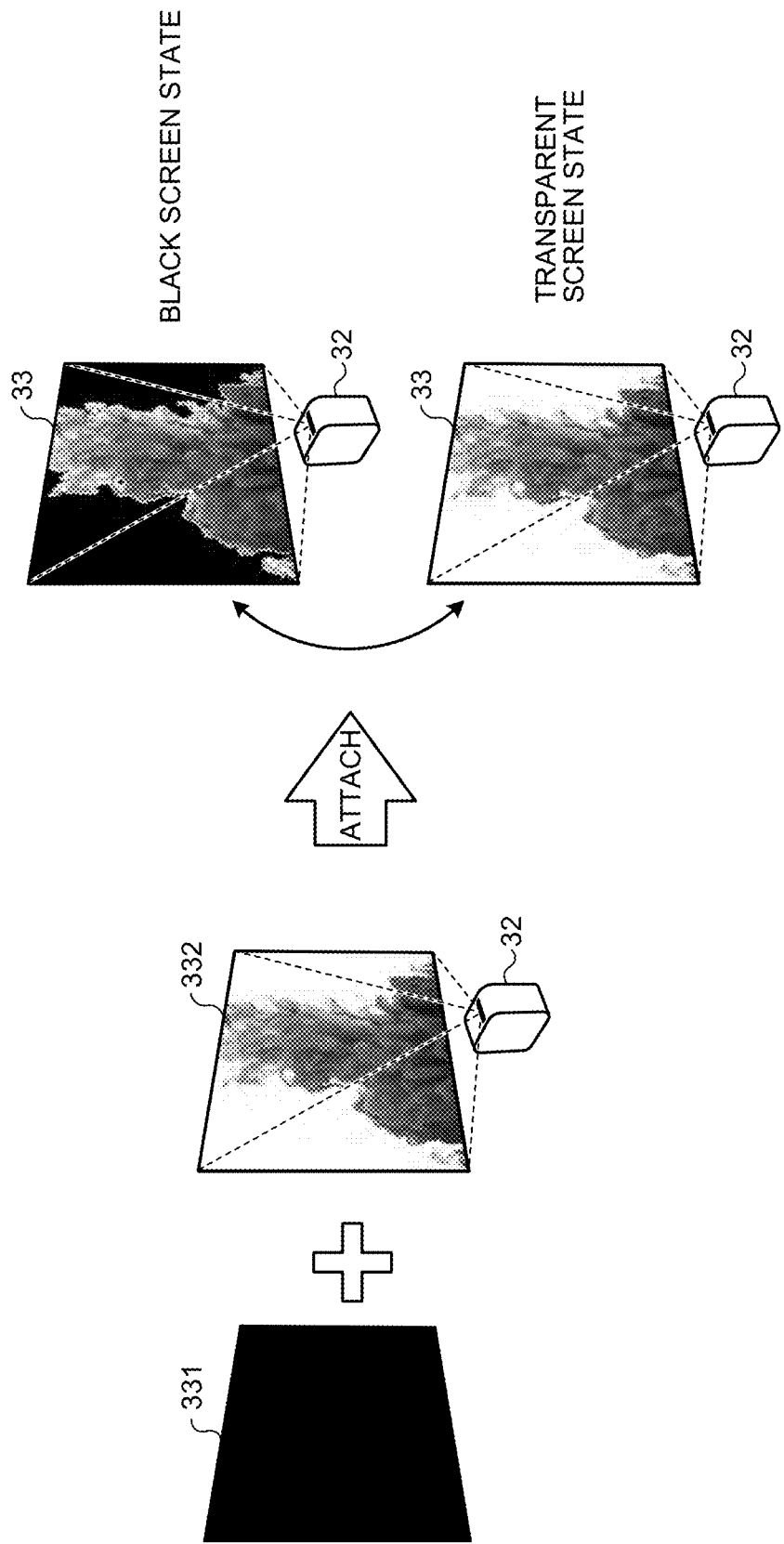
FIG. 7 is a diagram illustrating a first configuration example of a hybrid screen.

FIG. 7 is a diagram illustrating a first configuration example of the hybrid screen 33. The hybrid screen 33 according to the first configuration example is formed by attaching the transparent screen 332 and the light control film 331 to each other.

Light transmittance of the light control film 331 is adjustable by adjusting a voltage to be applied, or the like. Adjusting the transmittance of the light control film 331 causes the hybrid screen 33 according to the first configuration example to enter the transparent screen state (transmitting state), the block screen state (not-transmitting state), or a semi-transmitting state.

The transmitting state (transparent state) is, for example, a state in which transparency is at or higher than 70% and at or higher than 99.9% (may be a state where transparency is 100%) and the not-transmitting state (opaque state) is, for example, a state in which opacity is at or higher than 70% and at or higher than 99.9% (may be a state where opacity is 100%). The state of the hybrid screen 33 may include the semi-transmitting state. The semi-transmitting state is a state in which the transmittance is 30% to 70%. Note that the numerical value of the above-described transparency (opacity) is an example only. The transparency (opacity) in the transmitting state, the not-transmitting state, and the semi-transmitting state may be different from the aforementioned numerical values.

The hybrid screen 33 according to the first configuration example enables both transmission and a high contrast video.

Second Configuration Example of Hybrid Screen

Figure 8:
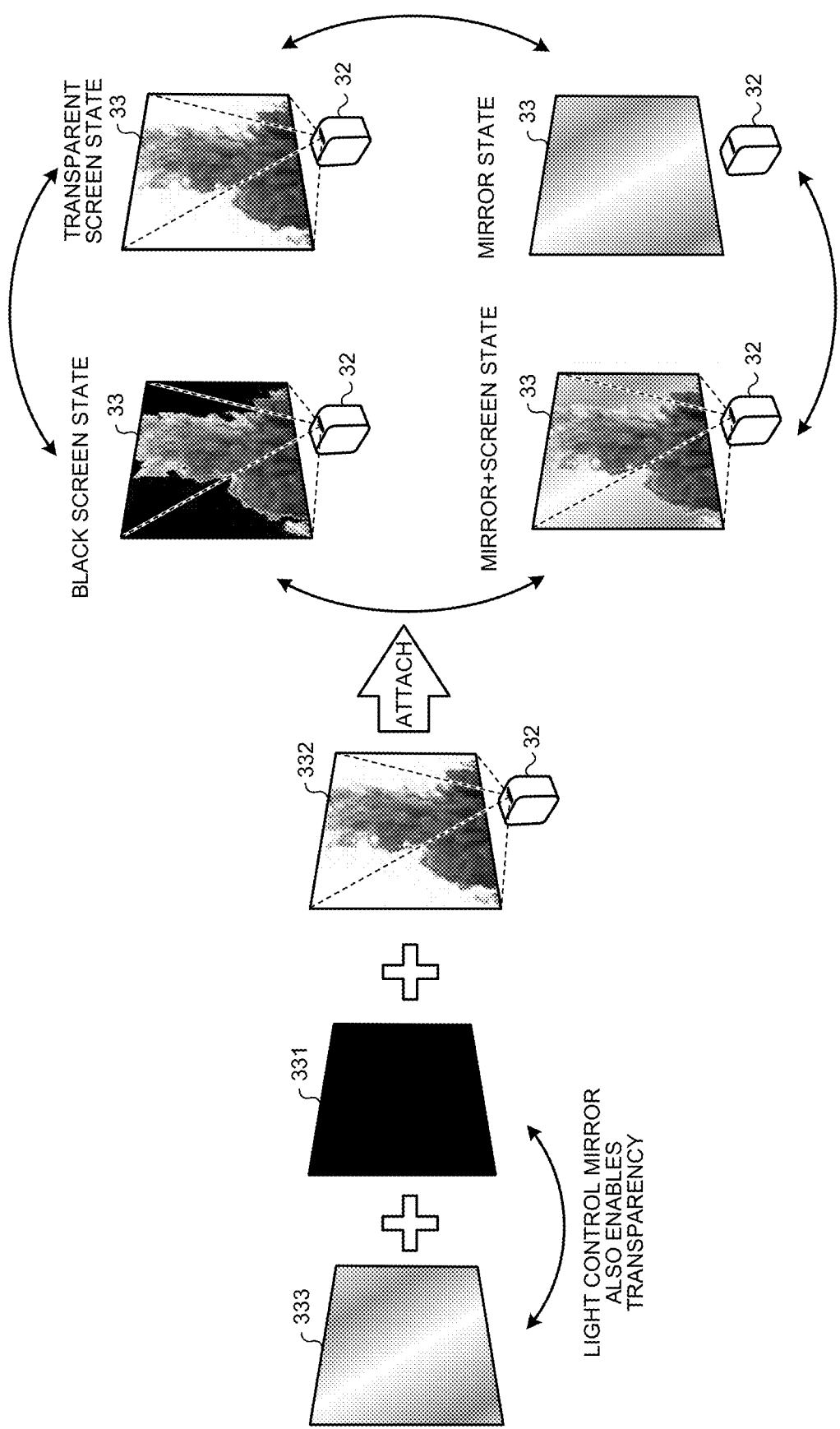
FIG. 8 is a diagram illustrating a second configuration example of the hybrid screen.

FIG. 8 is a diagram illustrating a second configuration example of the hybrid screen 33. The hybrid screen 33 according to the second configuration example is formed by attaching the transparent screen 332, the light control film 331, and the surface reflective mirror 333. The surface reflective mirror 333 may be a light control mirror whose light transmittance is adjustable. In this case, the surface reflective mirror 333 can be made transparent.

Adjusting the transmittance of the light control film 331 and the surface reflective mirror 333 causes the hybrid screen 33 according to the first configuration example to enter the transparent screen state (transmitting state), the black screen state (a first not-transmitting state), a mirror+screen state (a second not-transmitting state) or a mirror state (a third not-transmitting state). The state of the hybrid screen 33 may include a semi-transmitting state (for example, the transmittance is around 30% to 70%).

Because of the hybrid screen 33 according to the second configuration example, the image display system 1 enables both a mirror and a high contrast video.

Third Configuration Example of Hybrid Screen

Figure 9:
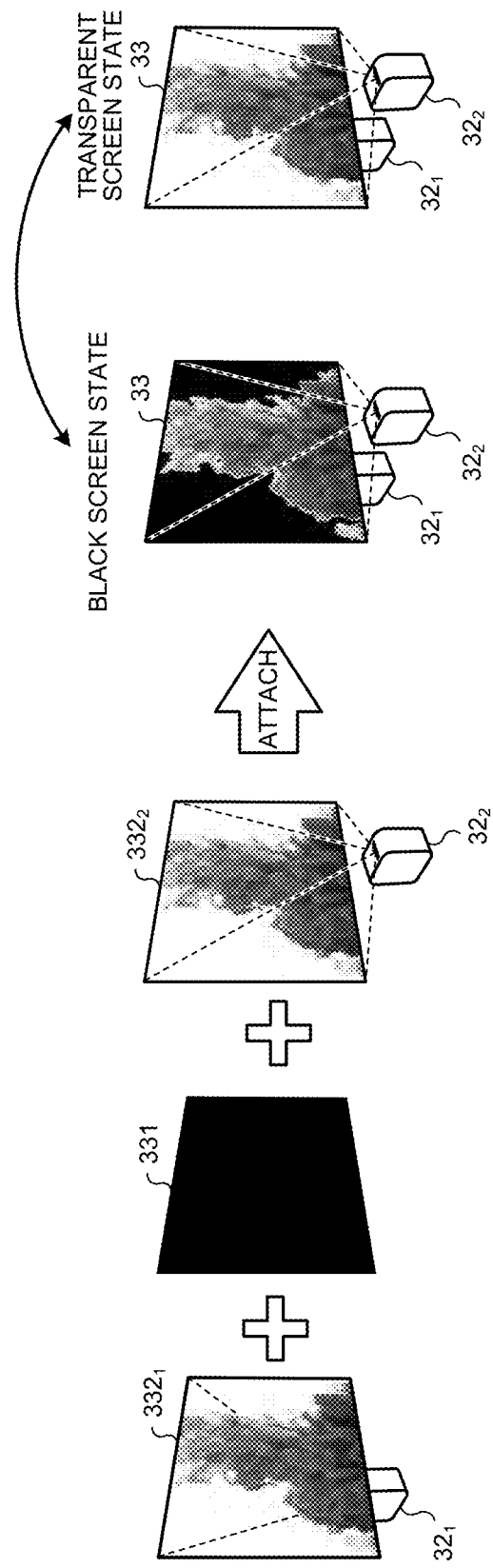
FIG. 9 is a diagram illustrating a third configuration example of the hybrid screen.

FIG. 9 is a diagram illustrating a third configuration example of the hybrid screen 33. The hybrid screen 33 according to the third configuration example is formed by attaching the two transparent screens 332 (transparent screens 3321 and 3322) and the light control film 331 that is arranged between the two transparent screens 332.

Adjusting the transmittance of the light control film 331 causes the hybrid screen 33 according to the third configuration example to enter the transparent screen state (transmitting state) or the black screen state (not-transmitting state). The state of the hybrid screen 33 may include the semi-transmitting state (for example, the transmittance is around 30% to 70%).

Because of the hybrid screen 33 according to the third configuration example, the image display system 1 is able to display different videos on both the surfaces of the screen.

Other Configuration Examples of Hybrid Screen

The above-described configuration examples are presented as examples only. The configuration of the hybrid screen 33 is not limited to the above described configuration examples. For example, the hybrid screen 33 may be formed by attaching the two transparent screens 332 (transparent screens 3321 and 3322) and the light control film 331 and the surface reflective mirror 333 that are arranged between the two transparent screens 332.

Transparent Screen

Figure 10:
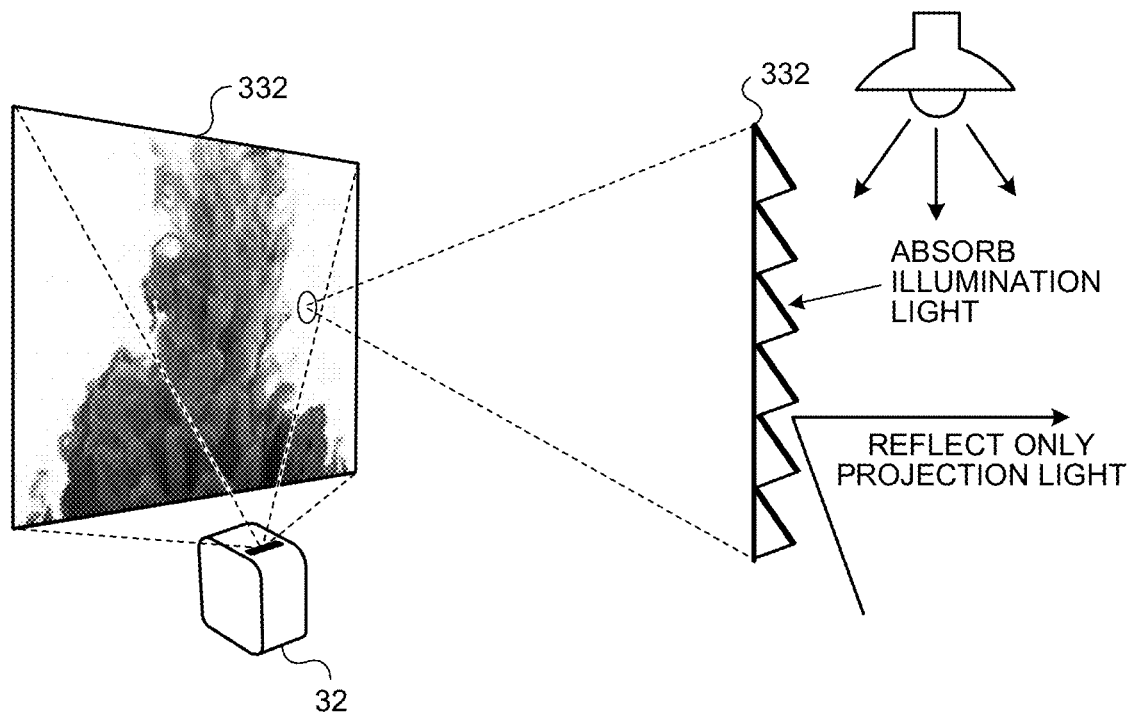
FIG. 10 is a diagram for describing a configuration of a transparent screen.
Figure 11:
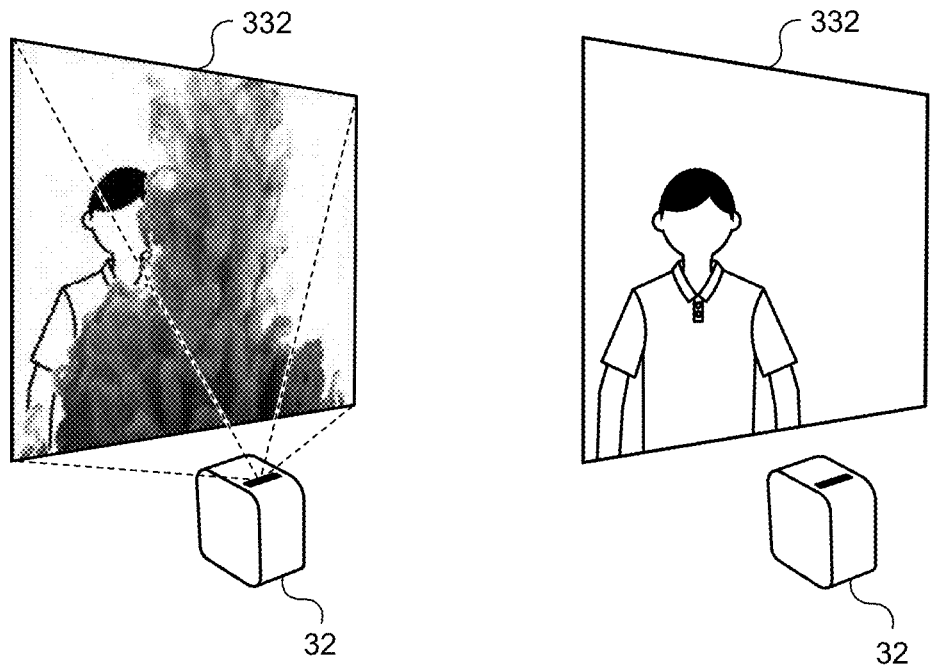
FIG. 11 is a diagram for describing the configuration of the transparent screen.

A configuration of the transparent screen 332 will be described. FIGS. 10 and 11 are diagrams for describing the configuration of the transparent screen 332. The transparent screen 332 is a transparent screen and it is possible to project an image to the transparent screen 332 with the projector 32. The transparent screen 332 makes it possible to view an object ahead the screen (a person standing ahead the screen in the example in FIG. 11).

Figure 12A:
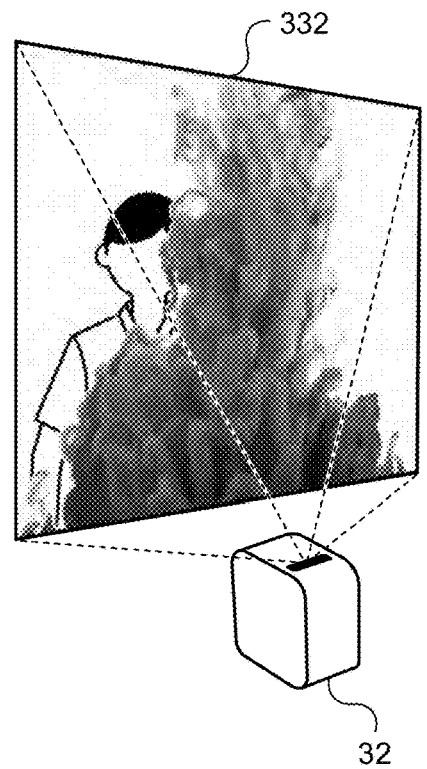
FIG. 12A is a diagram illustrating that an image is projected onto the transparent screen with a projector.
Figure 12B:
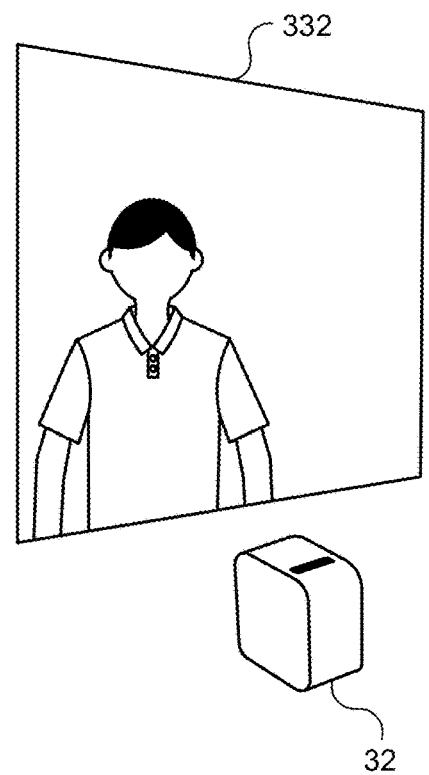
FIG. 12B is a diagram illustrating that projection of the image is stopped.

For example, as illustrated in FIG. 10, fine lens processing is performed on the screen surface of the screen the transparent screen 332. (As illustrated in FIG. 10, forming a triangular cross section on the transparent screen by fine processing enables reflection of light to have directionality. Forming a light blocking film on the triangular cross section that is formed by lens processing minimizes the effect of external light that is incident from above on the screen surface. Only light projected from the projector that is arranged in front of the screen such that the light is incident on the projector that is arranged below the screen or the reflector of the screen on which the lens processing is performed is reflected forward. Accordingly, the transparent screen 332 is able to provide a high-contrast image to the user even in a bright environment with intense external light. FIG. 12A is a diagram illustrating that the projector 32 projects an image onto the transparent screen 332 and FIG. 12B is a diagram illustrating that projection of the image is stopped. In both states, the user is able to view a person ahead of the transparent screen 332.

Light Control Film

Figure 13A:
FIG. 13A is a diagram for describing a configuration of a light control film.
Figure 13B:
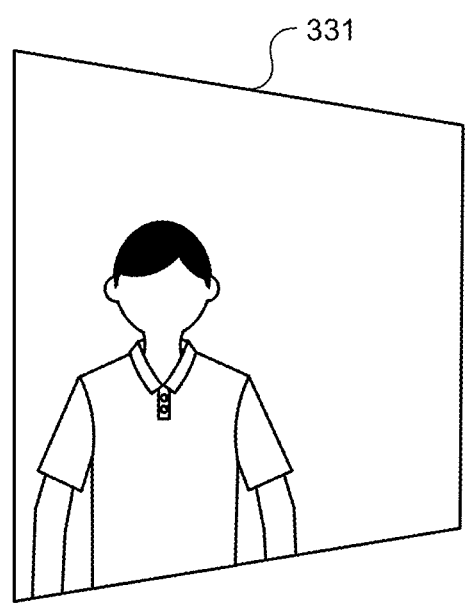
FIG. 13B is a diagram for describing the configuration of the light control film.

A configuration of the light control film 331 will be described next. The light control film 331 is a film whose light transmittance is changeable. FIGS. 13A and 13B are diagrams for describing the configuration of the light control film 331. FIG. 13A represents the light control film 331 in the not-transmitting state and FIG. 13B represents the light control film 331 in the transmitting state.

The light control film 331 is formed using, for example, dichroic dyes and liquid crystals. For example, controlling the voltage to be applied to the light control film 331 makes it possible to instantaneously switch between brightness and darkness of the light control film 331. Thus, the image display system 1 (the information processing device 20) is capable of controlling transmission light.

In the image display system 1 (the information processing device 20), the transmittance is adjustable by changing the voltage of the light control film 331. The light control speed of the light control film 331 is instantaneous and the image display system 1 (the information processing device 20) is able to switch between brightness and darkness quickly. Segmenting the light control film 331 enables the image display system 1 (information processing device 20) to perform partial light control.

Surface Reflective Mirror

Figure 14A:
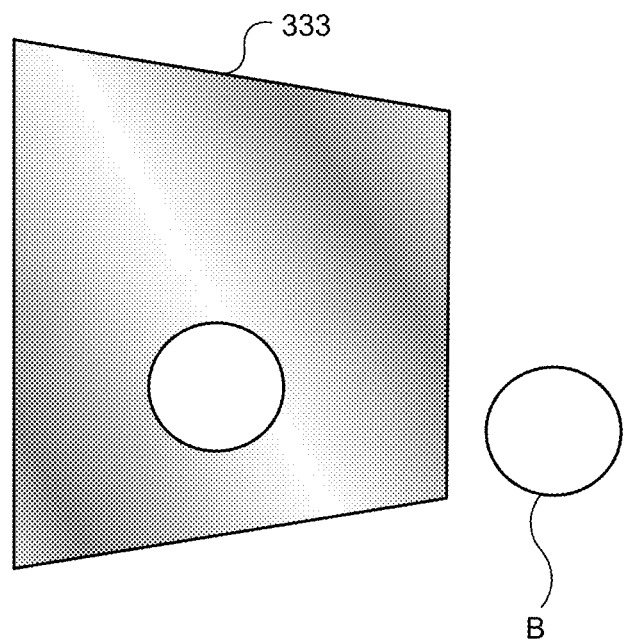
FIG. 14A is a diagram for describing a configuration of a surface reflective mirror.
Figure 14B:
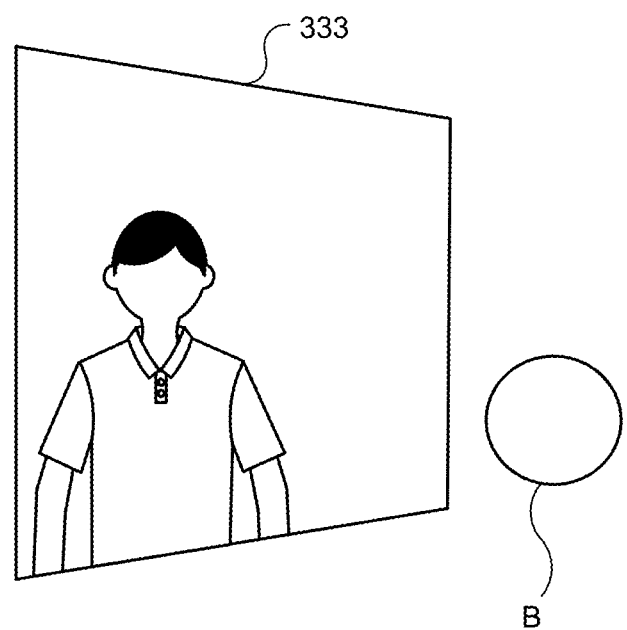
FIG. 14B is a diagram for describing the configuration of the surface reflective mirror.

A configuration of the surface reflective mirror 333 will be described next. The surface reflective mirror 333 of the present embodiment is a light control mirror whose light transmittance is changeable. FIG. 14A and FIG. 14B are diagrams for describing the configuration of the surface reflective mirror 333. FIG. 14A represents the surface reflective mirror 333 in the mirror state (not-transmitting state) and FIG. 14B represents the surface reflective mirror 333 in the non-mirror state (transmitting state).

In the example in FIG. 14A, a ball B in front of the surface reflective mirror 333 is in the surface reflective mirror 333. In the example in FIG. 14B, however, the ball B in front of the surface reflective mirror 333 is not in the surface reflective mirror 333 and a person ahead the surface reflective mirror 333 is viewable.

Projector

Figure 15A:
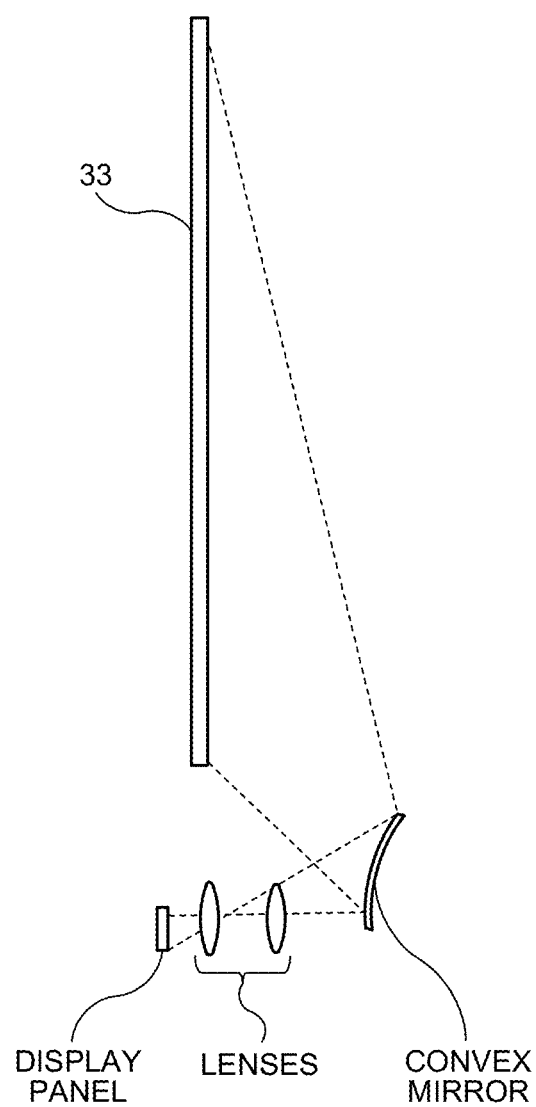
FIG. 15A is a diagram illustrating an example of optical projection by an ultra-short focus projector.
Figure 15B:
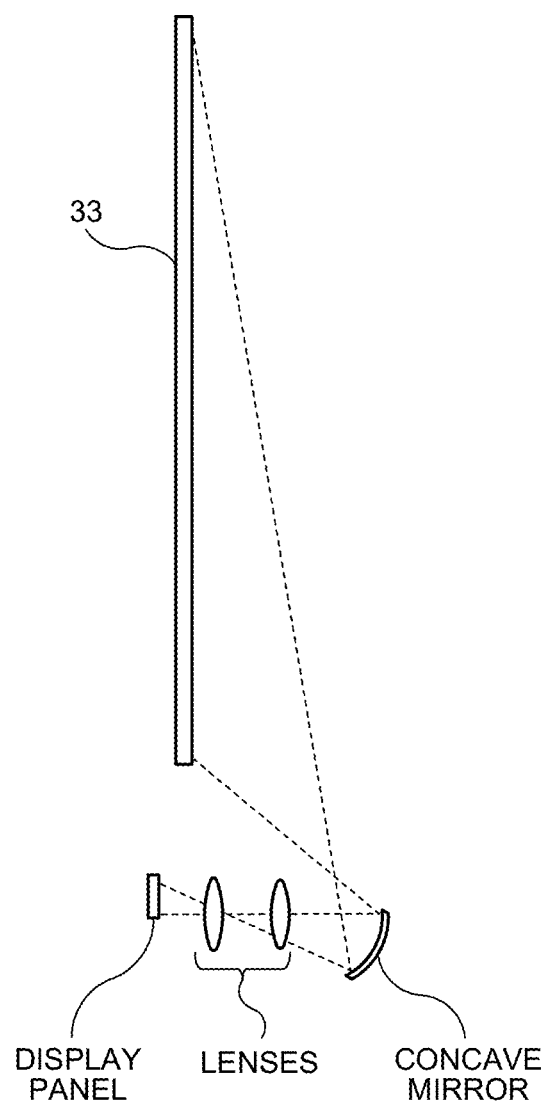
FIG. 15B is a diagram illustrating an example of optical projection by the ultra-short focus projector.

The projector 32 is a device for projecting an image onto the screen. The projector 32 may be a direct projection projector, a lens shift projector, a short focus projector or an ultra-short focus projector. FIG. 15A and FIG. 15B are diagrams illustrating examples of optical projection of an ultra-short focus projector. FIG. 15A is an example of a projector with a convex surface optical system and FIG. 15B is an example of a projector with a concave surface optical system. The projector 32 may be a projector with a convex surface optical system or a projector with a concave surface optical system. A projector with the concave surface optical system has a compact optical system because of convergence of light. In addition, it is preferable for folding.

Pan-Tilt Unit

The projector 32 may be a moving projector. In that case, the projector 32 may include the pan-tilt unit 31 and may be able to control the direction of projection. The pan-tilt unit 31 is a mechanism for pan and tilt (pan-tilt mechanism). The pan-tilt unit 31 may be incorporated and hidden in a casing forming the projector or a casing in which another projector is set. A roll mechanism may be also incorporated.

2-5. Example of Setting Screen

Examples of setting the hybrid screen 33 will be described.

FIGS. 16 to 23 are diagrams illustrating examples of setting the hybrid screen 33. FIGS. 16 to 23 illustrate different examples of setting the hybrid screen 33, respectively.

Figure 16:
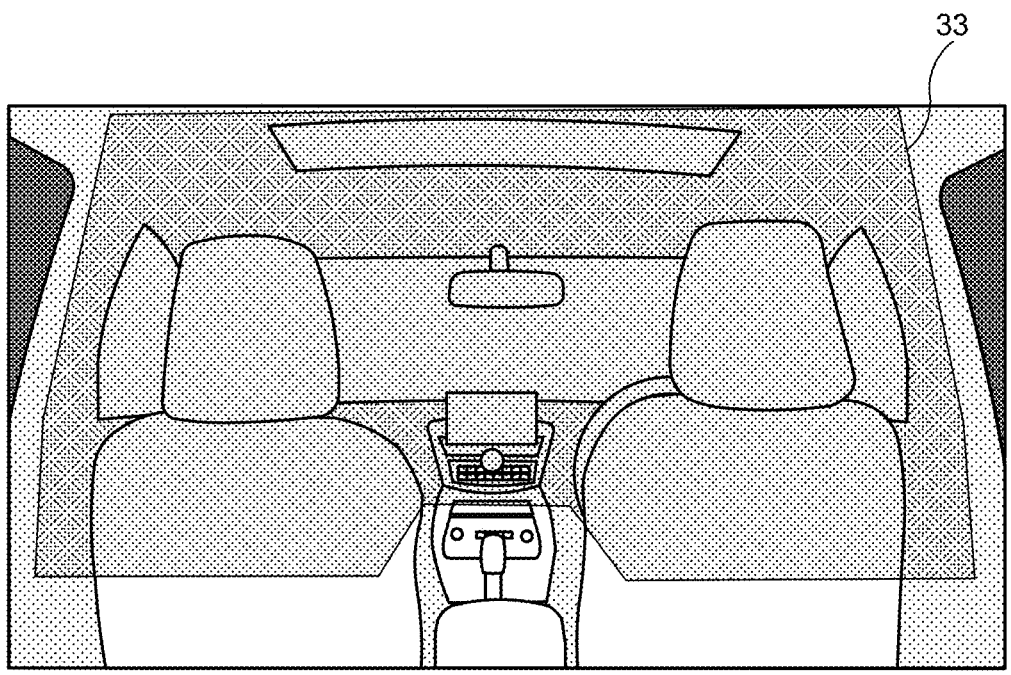
FIG. 16 is a diagram illustrating an example of setting a hybrid screen.

The hybrid screen 33 may be set in a position of partition between the font seat and the rear seats, for example, behind the driver's seat of a minivan. FIG. 16 illustrates that the single large hybrid screen 33 is set in the position of partition between the front seats and the rear seats.

Figure 17:
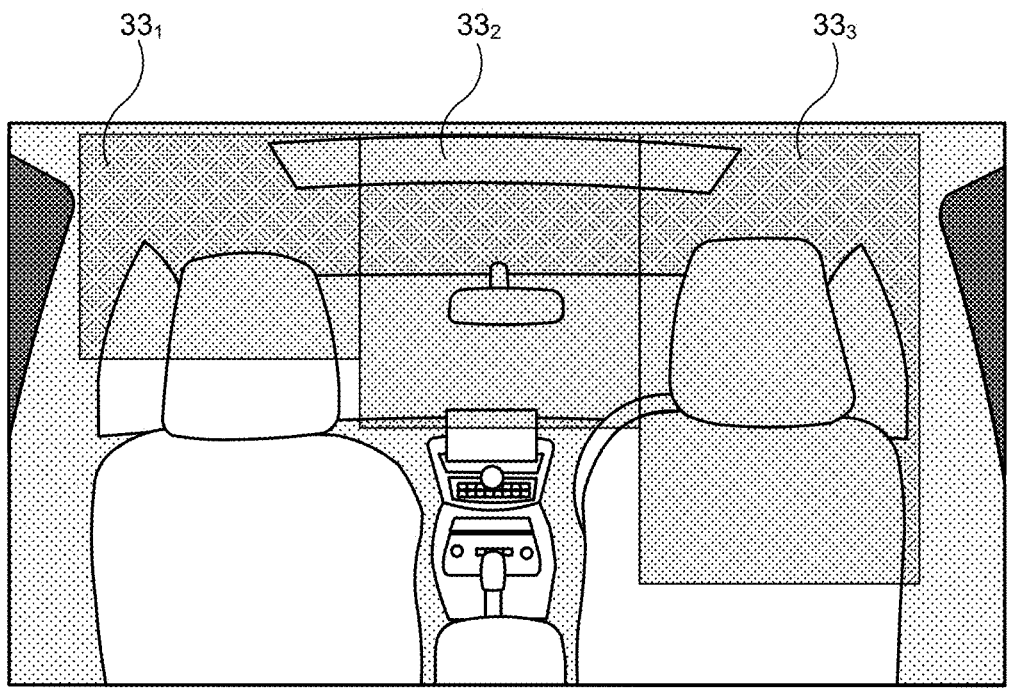
FIG. 17 is a diagram illustrating an example of setting a hybrid screen.

A plurality of the hybrid screens 33 may be tucked in the ceiling of the mobile object. FIG. 17 illustrates that the hybrid screens 33 are set such that they are hung from the ceiling in the position of partition between the front seats and the rear seats. The image display system 1 may be configured to open the minimum required hybrid screen 33. Specifically, a slide mechanism that opens and closes the screen like a door or a rotation mechanism that fixes the hybrid screen with hinges, or the like, and opens and closes the hybrid screen on the fixed part may be in the ceiling or between the hybrid screens. In the example in FIG. 17, the image display system 1 (the information processing device 20) is capable of performing open/close control on each of the hybrid screens 331 to 333. In the example in FIG. 17, because only the minimum screen is opened, it is possible to realize high livability.

Note that the harness system of the hybrid screen 33 may be configured such that tangling is not caused. For example, the harness may be formed into a spiral like a telephone cord or, for translation, into a S shape.

FIGS. 18 to 23 illustrate examples of setting the hybrid screen 33 and examples of display of content on the hybrid screen 33.

Figure 18:
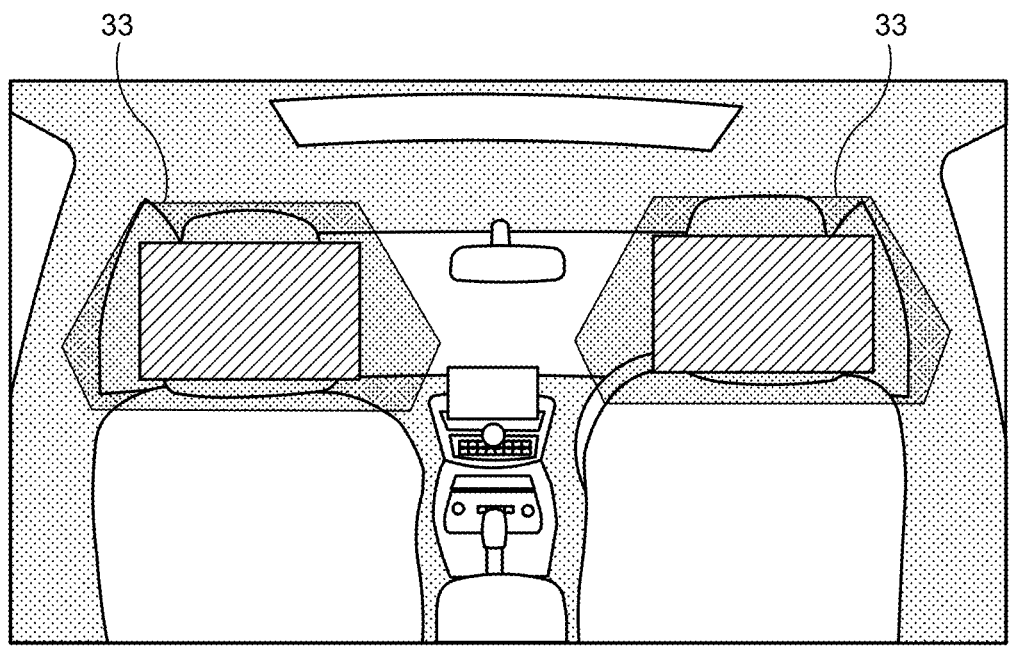
FIG. 18 is a diagram illustrating an example of setting a hybrid screen.
Figure 19:
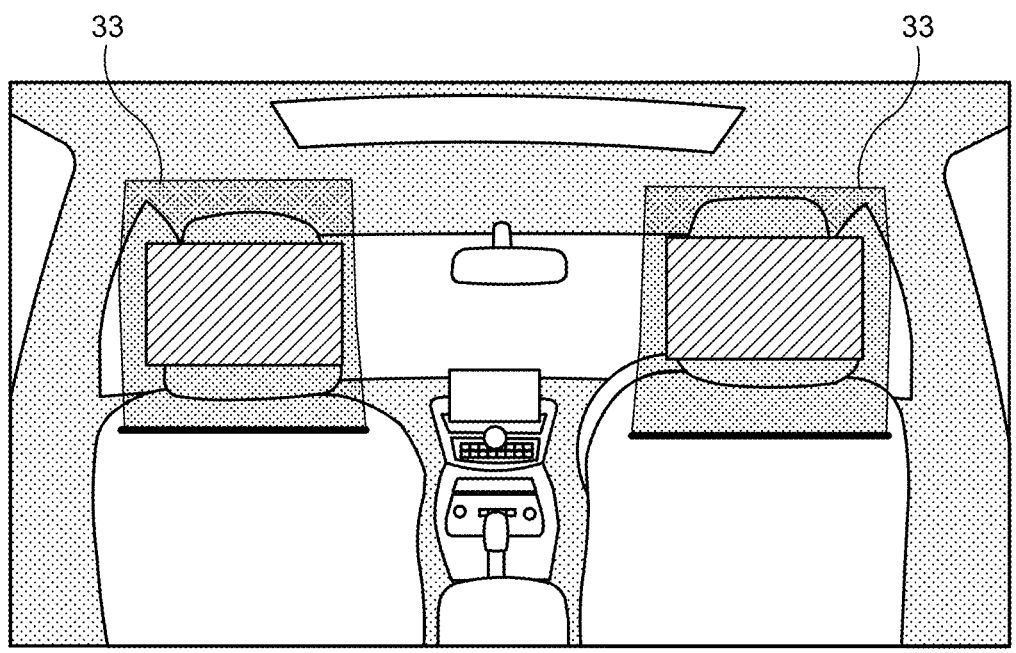
FIG. 19 is a diagram illustrating an example of setting a hybrid screen.

FIGS. 18 and 19 represent examples in which the hybrid screen 33 is set on the back of each of the headrests of the front seats. The hatched part in the drawing is the part onto which content is projected. In the examples in FIGS. 18 and 19, while content is projected onto the back of the head rests such that they do not disturb driving, images larger than those in the case where displays are embedded in head rests (images in such a size that the images deviate from the head rests slightly) are projected. In the examples in FIGS. 18 and 19, it is possible to realize both ease of viewing backward to the driver and a preferable viewing environment.

Figure 20:
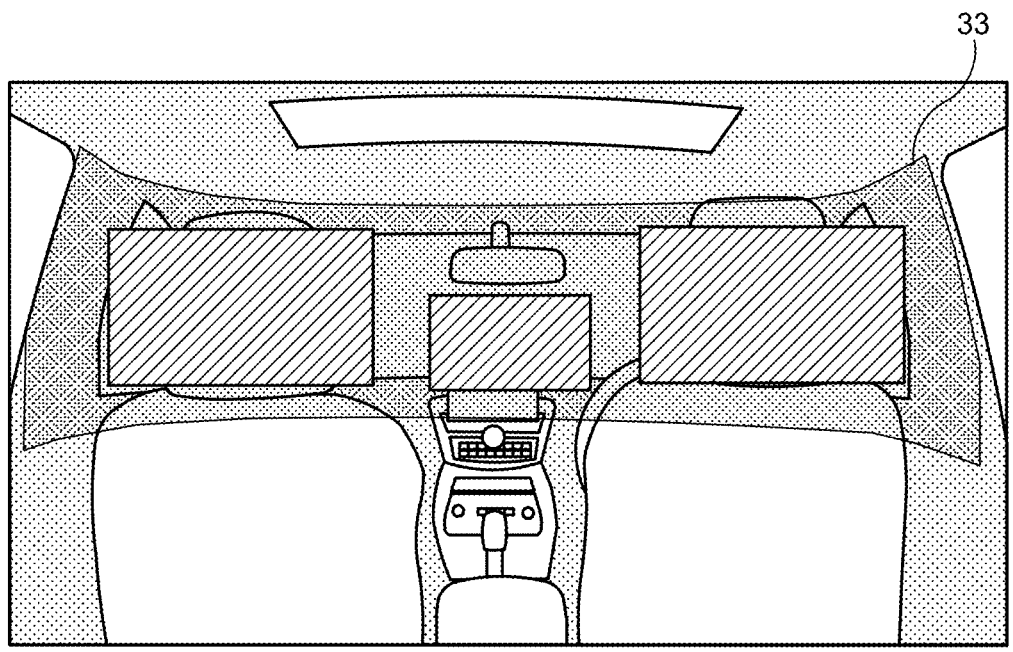
FIG. 20 is a diagram illustrating an example of setting a hybrid screen.
Figure 21:
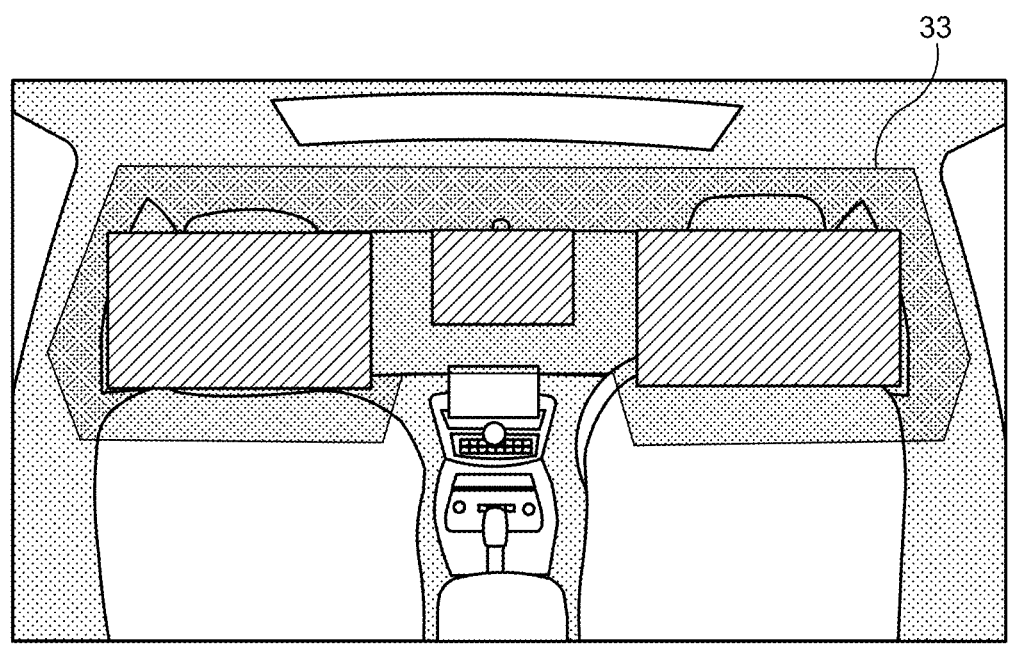
FIG. 21 is a diagram illustrating an example of setting a hybrid screen.

FIGS. 20 and 21 are examples in which the single hybrid screen 33 is set in the position of partition between the front seats and the rear seats. The hatched parts in the drawing are parts onto which content is projected. In the examples in FIGS. 20 and 21, content is projected onto, in addition to the back of the headrests of the front seats, the center between the headrests. In the examples in FIGS. 20 and 21, it is possible to provide much information to the user. On the hybrid screen, because transparency is high in the area other than the area on which light control is performed to perform projection from the projector, the users on the front seats are able to check the circumstances behind.

Figure 22:
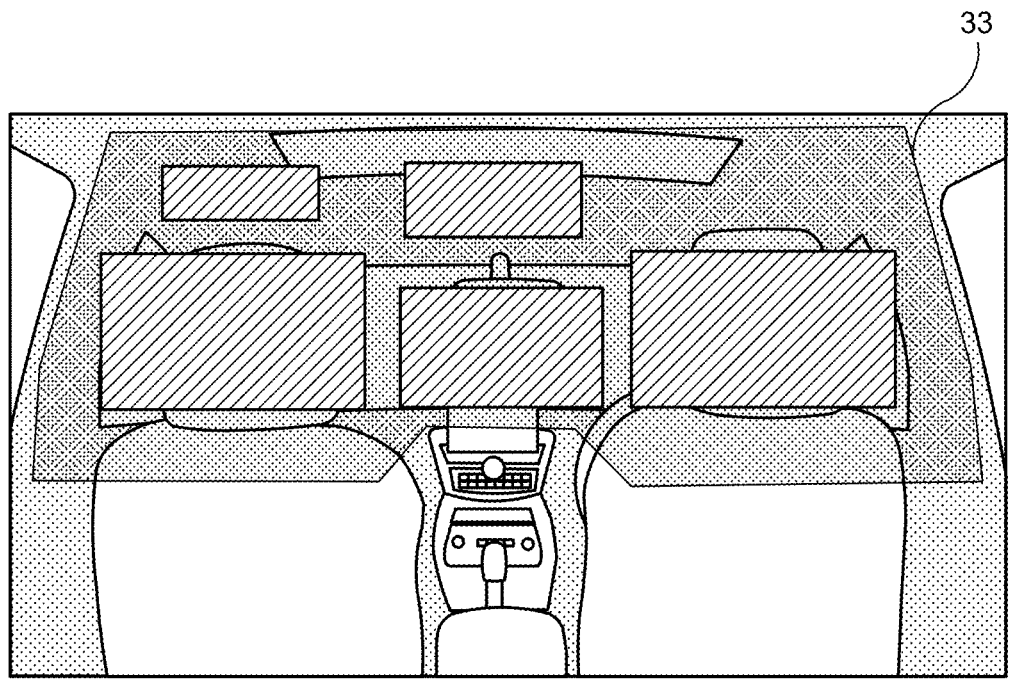
FIG. 22 is a diagram illustrating an example of setting a hybrid screen.
Figure 23:
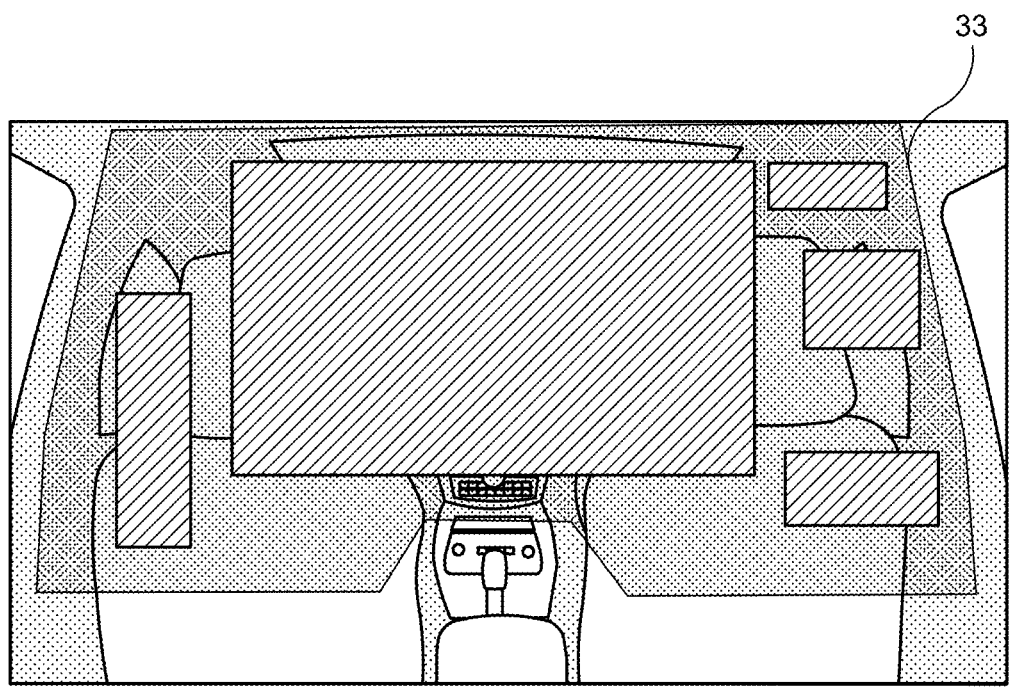
FIG. 23 is a diagram illustrating an example of setting a hybrid screen.

FIGS. 22 and 23 present examples in which the single large hybrid screen 33 is set in a position of partition between the front seats and the rear seats. The hatched parts in the drawing are parts onto which content is projected. In the examples in FIGS. 22 and 23, a lot of projection areas and large projection areas are kept. A large screen may be realized by a blending technique (technique of showing a single large image by superimposing part of projections by a plurality of the projectors 32). In the examples in FIGS. 22 and 23, it is possible to provide an extremely preferable viewing environment to the user.

The examples illustrated in FIGS. 16 to 23 are with users on the rear seats in mind. In a car with a user on a front seat (for example, a user on the driver's seat or the front passenger seat) and, in a 9-seater wagon, front seats, middle seats and rear seats, the hybrid screens 33 may be arranged between the front seats and the middle seats or between the middle seats and the rear seats. The hybrid screens 33 may be arranged on a glass of the car (for example, the glass on a side of the rear seats or, if there are middle seats, a glass on a side of the middle seats). Note that it can be expected that the driver would not be required as a person on board as the level of the autonomous driving increases. In this case, the hybrid screen 33 may be arranged in front of all the seats generally such that the same viewing environment can be provided to the seats generally.

Figure 24:
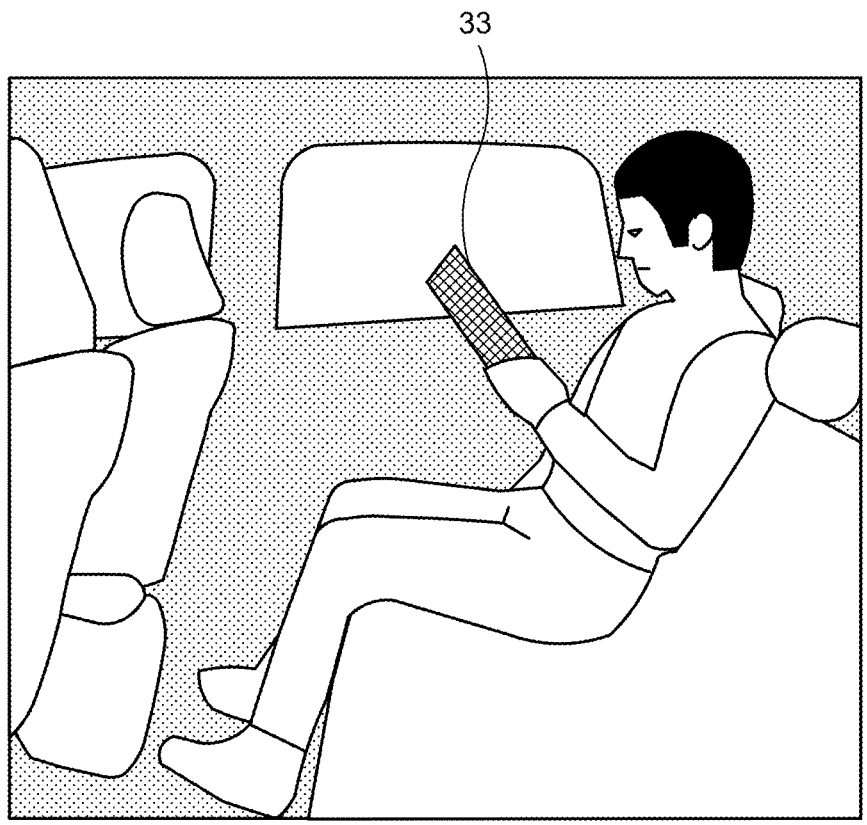
FIG. 24 is a diagram illustrating an example of a detachable hybrid screen.

The hybrid screen 33 may be detachable like a tablet. FIG. 24 is an example of the hybrid screen 33 that is detachable. In this case, the image display system 1 may include a sensor (for example, a ToF sensor) that senses any one or both of a position and an orientation of the hybrid screen 33. The detection device 10 may include the sensor or the information processing device 20 may include the sensor. Based on the result of detecting any one or both of a position and an orientation of the hybrid screen 33, the information processing device 20 may control the direction of projection by the projector 32 such that content is displayed on the hybrid screen 33. In that case, the information processing device 20 may realize control on the direction of projection by the projector 32 by controlling the pan-tilt unit 31. Note that content may be projected onto the hybrid screen 33 by stacking projections from different angles (superimposition of projections) with a plurality of the projectors 32. It is possible to reduce the possibility that projection would lead to the shade of the user.

Figure 25:
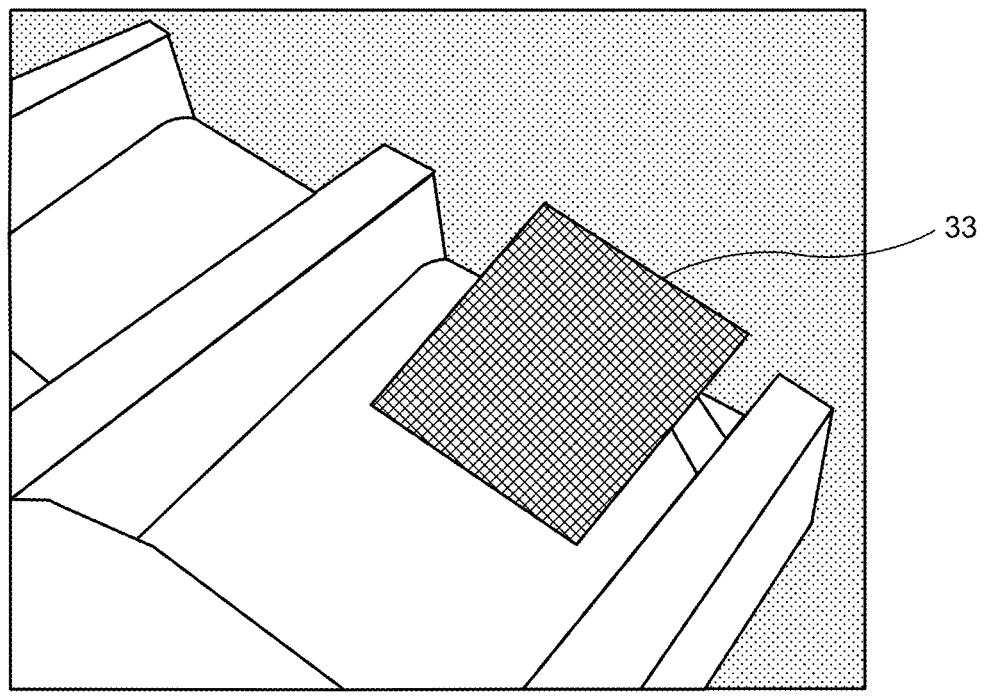
FIG. 25 is a diagram illustrating an example in which a hybrid screen is attached to a chair.

The hybrid screen 33 may be set on a chair (seat). FIG. 25 is an example in which the hybrid screen 33 is attached to a chair. In the example in FIG. 25, the hybrid screen 33 is attached to an armrest of a chair (seat) like a table that is attached to a chair (seat) of a luxury car, an airplane, or a bullet train.

The hybrid screen 33 may slide downward from the back surface of a headrest of a chair and may be fixed in a state of extending horizontally at the center part on a back of the chair. In other words, the hybrid screen 33 is fixed like a table that is fixed on the back surface of a chair. In the configuration, it is preferable that the hybrid screen 33 be fixed such that the hybrid screen 33 faces in a downward direction with respect to the horizontal direction to allow a user to view content easily.

Figure 26:
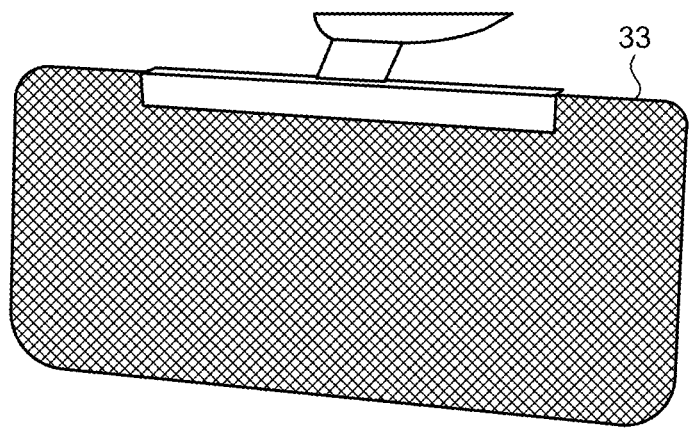
FIG. 26 is a diagram illustrating an example of a sun-visor type hybrid screen.

The hybrid screen 33 may be set in a position of a sun visor. FIG. 26 is a diagram illustrating an example of the hybrid screen 33 in a form of a sun visor. In this case, the hybrid screen 33 may be freely movable manually or electrically to a given position on the ceiling. When moving electrically, the information processing device 20 may sense a position of an observer and move the hybrid screen 33 to an optimum position or such that the hybrid screen 33 turns to an optimum direction. As describe described above, a main weight of an electronic device, such as the projector 32, or the like is not set in the hybrid screen 33. Thus, it is possible to reduce the size and weight of a drive system, such as a motor, that moves the hybrid screen 33.

The configuration of the hybrid screen 33 illustrated in FIGS. 24 to 26 may be used in combination as appropriate.

For example, the configurations in FIG. 24 in which the hybrid screen 33 is detachable is applicable to the configurations in FIGS. 25 and 26. In the configuration, a terminal enabling the hybrid screen 33 to be charged may be formed in the chair. The position of projection of content may be changed to the position of the hybrid screen 33 that is moved based on connection of the hybrid screen 33 to the charging terminal. In other words, the acquisition unit 261 acquires information on the position on the hybrid screen 33 indirectly from connection of the hybrid screen 33 to the charging terminal.

A position of the hybrid screen 33 may be specified based on the detection result of the detection device 10 and the position of projection of content may be shifted according to the position of the hybrid screen 33. For example, a position of the hybrid screen 33 is acquired by the acquisition unit 261 according to an image recognition result based on a captured image. When the user freely moves the hybrid screen 33 manually, it is preferable that control on the position of projection based on the detection result on light outside the mobile object to be described below be inhibited or prohibited.

2-6. Examples of Setting Projector

Examples of setting the projector 32.

FIGS. 27 to 30 are examples of setting the projector 32. FIGS. 27 to 30 illustrate different examples of setting the projector 32, respectively.

Figure 27:
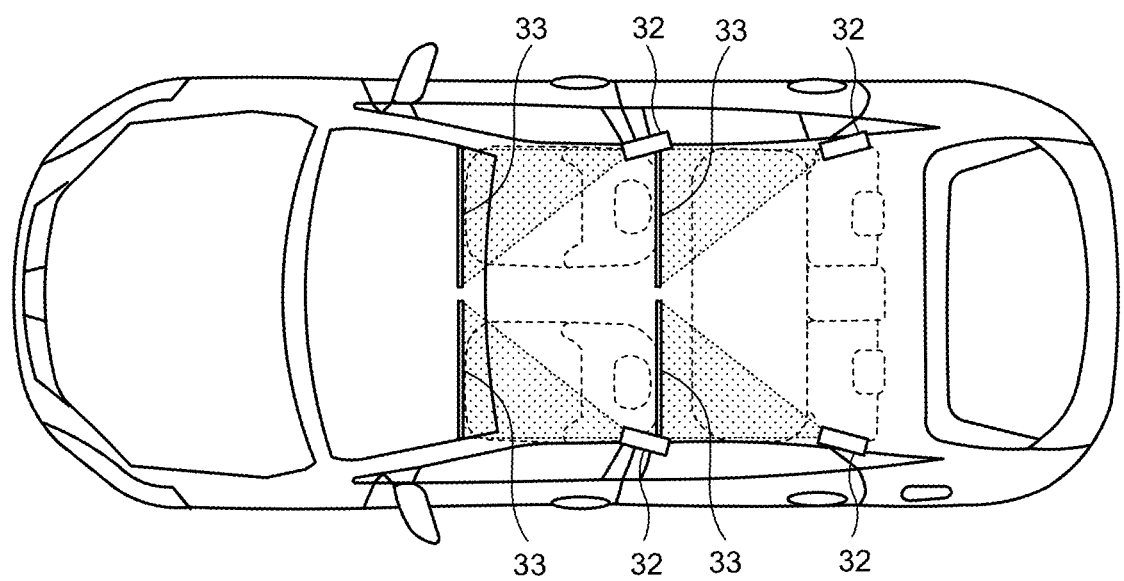
FIG. 27 is a diagram illustrating an example of setting projectors.
Figure 28:
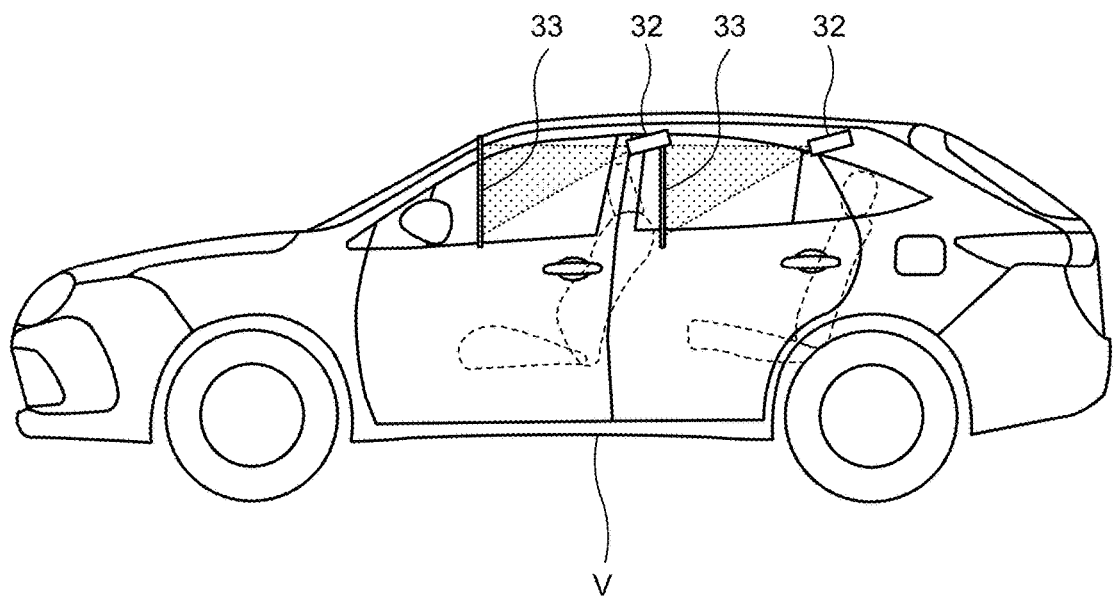
FIG. 28 is a diagram illustrating the example of setting projectors.
Figure 29:
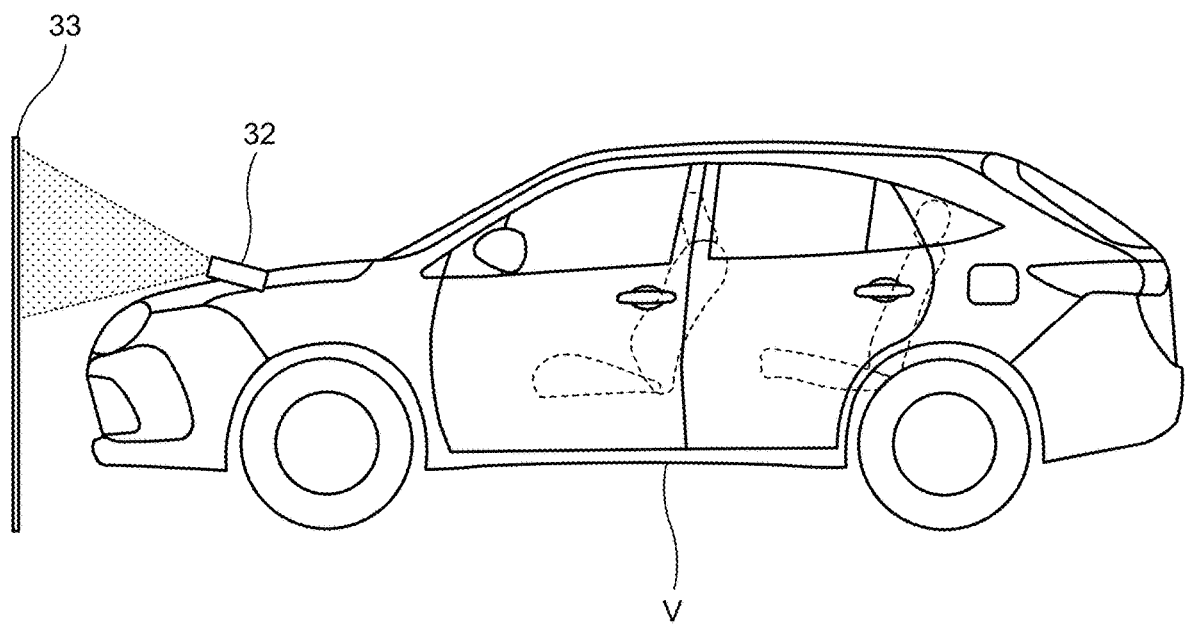
FIG. 29 is a diagram illustrating an example of setting a projector.
Figure 30:
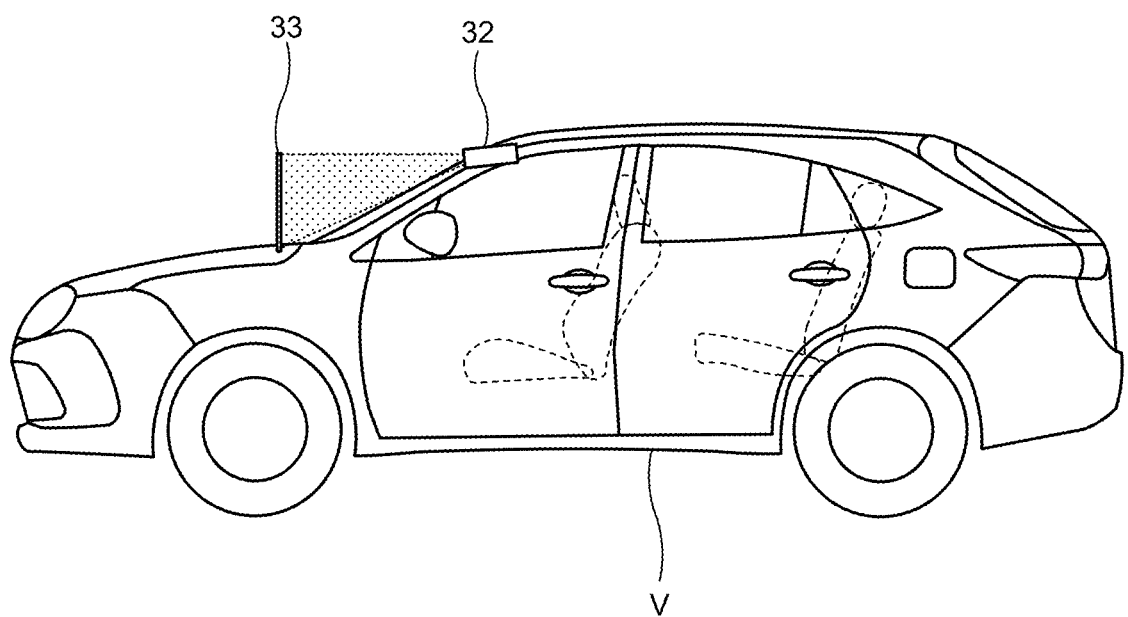
FIG. 30 is a diagram illustrating an example of setting a projector.

In the examples in FIG. 27 and FIG. 28, the hybrid screen 33 is set in front of each of front seats and rear seats. In the example in FIG. 27, the projectors 32 are embedded inside doors of the vehicle V and content is projected therefrom to the hybrid screens 33. In the example in FIG. 28, the projectors 32 are embedded inside doors of the vehicle V and content is projected therefrom to the hybrid screens 33. The positions in which the projectors 32 are set are not limited to these examples. For example, the projectors 32 may be embedded in seats of the vehicle V.

The hybrid screen 33 may be set in front of the vehicle V (for example, in parking). The image display system 1 may project content from the projector 32 that is set in a given position in the vehicle V to the hybrid screen 33. In the example in FIG. 29, the projector 32 is set near the bonnet of the vehicle V and content is projected therefrom to the hybrid screen 33. In that case, the image display system 1 (the information processing device 20) may keep the hybrid screen 33 in the transparent state usually (when the vehicle V is not in the parking). Accordingly, the view of the parking is not damaged. The image display system 1 (the information processing device 20) may perform light control on the hybrid screen 33 when the user of the vehicle V watches a movie or according to change in the circumstances focusing heavily on privacy. In this case, the projector 32 may be housed in a headlight or a front grill.

The hybrid screen 33 may be set near the bonnet of the vehicle V. In that case, the hybrid screen 33 may be configured to rise from the vicinity of the bonnet of the vehicle. In the example in FIGS. 13A and 13B, the projector 32 is set near the top of the front glass of the vehicle V and content is projected therefrom to the hybrid screen 33. In this case, the projector 32 may be housed in the dashboard or a side mirror.

3. Example of Operations of Image Display system

Operations of the image display system 1 will be described next.

3-1. System Configuration Used for Description

An example of a system configuration that is used to describe operations of the image display system 1 will be described next.

Figure 31:
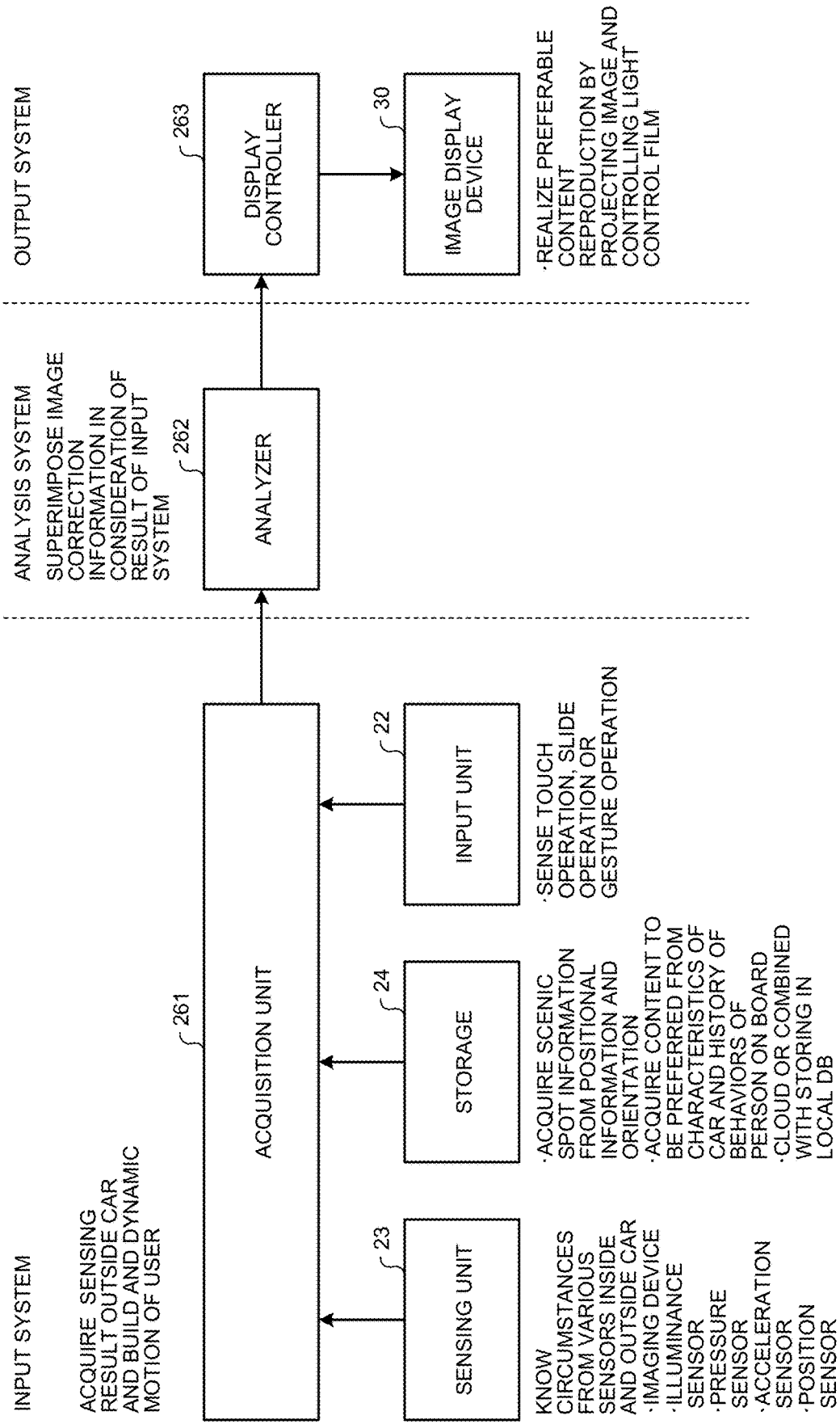
FIG. 31 is a diagram illustrating an example of a system configuration that is used to describe operations of the image display system.

FIG. 31 is a diagram illustrating an example of the system configuration that is used to describe operations of the image display system 1. The image display system 1 is classified into an input system, an analysis system, and an output system.

Input System

The input system acquires a result or sensing inside and outside the car and information on the build and dynamic motions of the user. The input system consists of the sensing unit 23, the storage 24, the input unit 22, and the acquisition unit 261.

The sensing unit 23 knows circumstances from various sensors inside and outside the car. The information processing device 20 may include the sensors or a device outside the information processing device 20 may include the sensors. The sensor is, for example, an imaging device, an illuminance sensor, a pressure sensor, an acceleration sensor, or a position sensor.

The storage 24 stores various types of information. The storage 24 may store scenic spot information that is acquired from information of the current position and orientation of the mobile object. The storage 24 may store preferred content that is determined from characteristics of the car and the history of behaviors of the person on board. The storage 24 need not necessarily be a storage device that the information processing device 20 holds. The storage 24 may be in a cloud. The storage 24 may be a combination of a database in a cloud and a local database.

The input unit 22 acquires information from the user or the car. For example, the input unit 22 senses a touch operation, a slide operation, a gesture operation, etc., of the user.

The acquisition unit 261 acquires information from the sensing unit 23, the storage 24 and the input unit 22.

Analysis System

The analysis system superimposes image correction information in consideration of the result of the input system. The analysis system consists of the analyzer 262.

The analyzer 262 makes an analysis for image display based on the information that is acquired by the acquisition unit 261.

Output System

The output system outputs various types of information. The output system consists of the display controller 263 and the image display device 30.

The display controller 263 controls the image display device 30 based on the result of analysis by the analyzer 262.

The image display device 30 displays an image according to control of the display controller 263. The image display device 30 realizes preferable reproduction of content by controlling image projection, the light control film, and the light control mirror.

3-2. Process Flow

Figure 32:
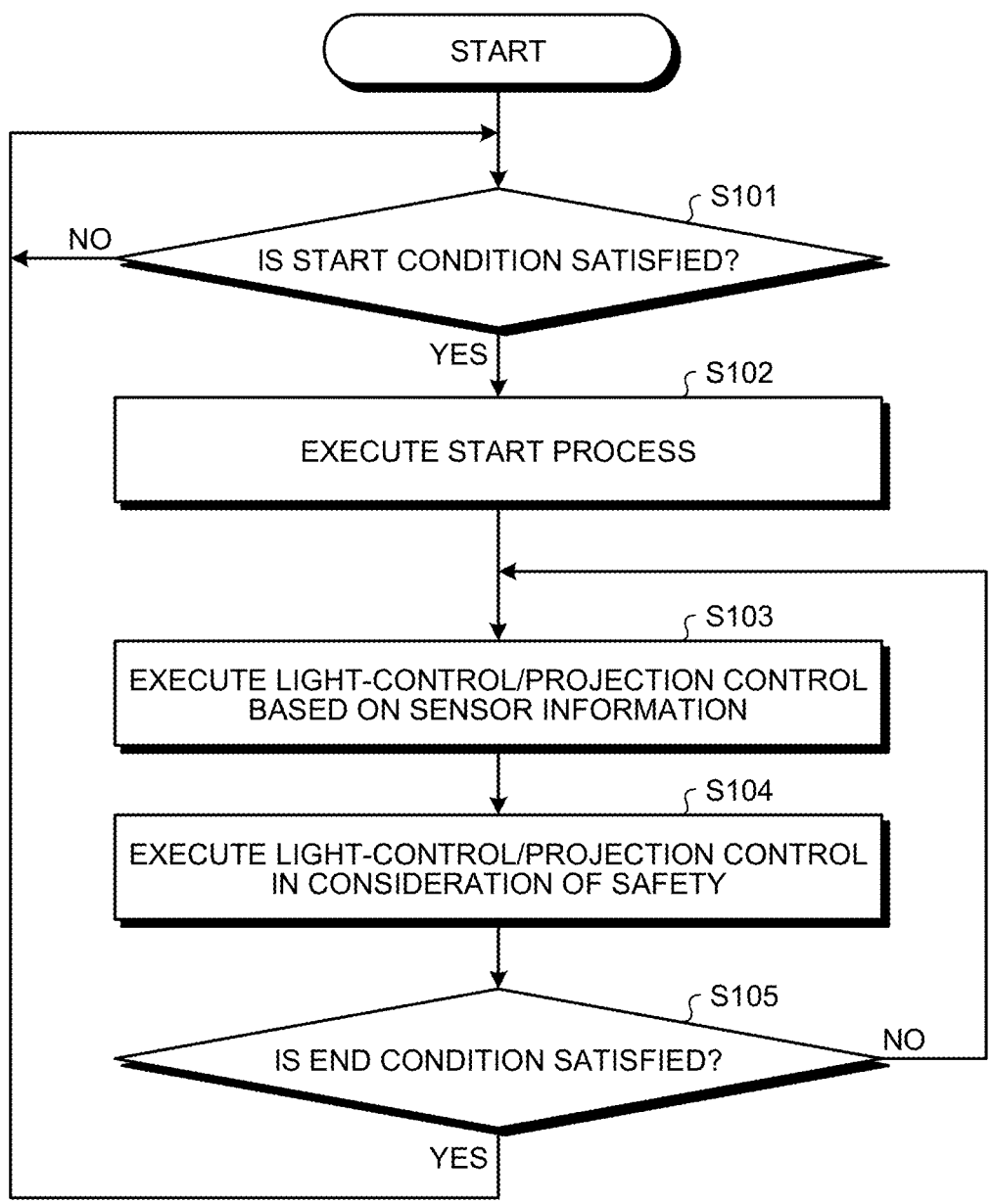
FIG. 32 is a flowchart illustrating an image display process according to the embodiment of the disclosure.

FIG. 32 is a flowchart illustrating an image display process according to the embodiment of the present disclosure. The image display process illustrated in FIG. 32 is executed when power is supplied to the image display system 1 (for example, the information processing device 20). The image display process presented illustrated below is executed by the controller 26 of the information processing device 20. The image display process will be described below with reference to FIG. 32.

First of all, the controller 26 of the information processing device 20 determines whether a start condition is satisfied (step S101). For example, the acquisition unit 261 of the information processing device 20 acquires a video of the user from the imaging device. The analyzer 262 of the information processing device 20 recognizes a gesture of the user based on the video of the user. The analyzer 262 recognizes a motion of a hand of the user and, when it is determined that the motion is a given gesture, determines that the start condition is satisfied. The controller 26 may determine that the start condition is satisfied when the engine moves, a touch input is made on the hybrid screen or, in the case of a digitized car, it may be determined that the start condition is satisfied when other authentication is made.

When the start condition is not satisfied (step S101: NO), the controller 26 repeats step S101 until the start condition is satisfied. When the start condition is satisfied (step S101: YES), the controller 26 executes a start process (step S102). For example, the controller 26 executes a process of initializing a program or starts the detection device 10 and the image display device 30.

When the start process completes, the controller 26 executes light-control/projection control based on sensor information (step S103). For example, the acquisition unit 261 of the information processing device 20 acquires a detection result on light outside the mobile object and, based on the detection result on light outside the mobile object, the analyzer 262 of the information processing device 20 determines a position of projection of content in the mobile object. The display controller 263 of the information processing device 20 performs control on projection of content onto the determined position of projection. The light-control/projection control based on sensor information will be described in detail below.

Subsequently, the controller 26 executes light-control/projection control in consideration of safety (step S104). For example, the controller 26 performs light-control/projection control during normal driving or at occurrence of an accident (control in consideration of safety) and light-control/projection control according to sensing of looking away or drowsing. "Light-control/projection control in consideration of safety" will be described in detail below.

Subsequently, the controller 26 determines whether an end condition is satisfied (step S105). For example, the controller 26 determines that the end condition is satisfied when the user makes a given gesture. The controller 26 may determine that the end condition is satisfied when the engine stops or in response to a touch input to the hybrid screen.

When the end condition is not satisfied (step S105: NO), the controller 26 returns to step S103 and repeats steps S103 to S105 until the end condition is satisfied. When the end condition is satisfied (step S105: YES), the controller 26 returns to step S101 and waits until the start condition is satisfied.

3-3. Light-Control/Projection Control Based on Sensor Information

"Light-control/projection control based on sensor information" at step S103 will be described in detail below.
Control Based on Result of Detecting External Light Projection control based on a detection result on light outside the mobile object is conceivable as the light-control/projection control based on sensor information. Note that, when not particularly specified, control of the disclosure need not necessarily refer to the detection result on light outside the mobile object. In other words, for example, in the configuration in FIG. 26, only the result of sensing a position of the observer may be referred to in order to shift the hybrid screen. Thus, control not referring to the detection result on light outside the object is also covered by the technical scope of the disclosure.

The information display system 1 senses external light in real time, specifies a position effective to display content, and performs light-control/projection control. In that case, the information display system 1 may perform control based on information from various sensors or sensor+cloud. For example, the information display system 1 may perform control based on information of Examples 1 to 4 below.

Example 1: Information of Illuminance Sensors in Multiple Directions

Example 2: Image Analysis Information from a Single Direction or Multiple External Imaging Devices Example 3: Image Analysis Information from a Single Direction or Multiple External Imaging Devices Example 4: A 9-Axis (3-Axis Acceleration+3-Axis Gyro+3-Axis Compass) Sensor+Position Information+Date=Sunlight Direction Specifically, the information processing device 20 may execute the process below.

For example, the acquisition unit 261 of the information processing device 20 acquires the detection result on light outside the mobile object (for example, a result of sensing external light in real time). For example, the acquisition unit 261 acquires a result of detecting a direction of incidence of light outside the mobile object on the mobile object. The direction of incidence may be estimated based on the position of the mobile object and the position of the sun contained in weather information. In that case, the acquisition unit 261 may acquire a detection result on the person in the mobile object together. For example, the acquisition unit 261 may acquire the result of detecting a position of the person in the mobile object.

Figure 33:
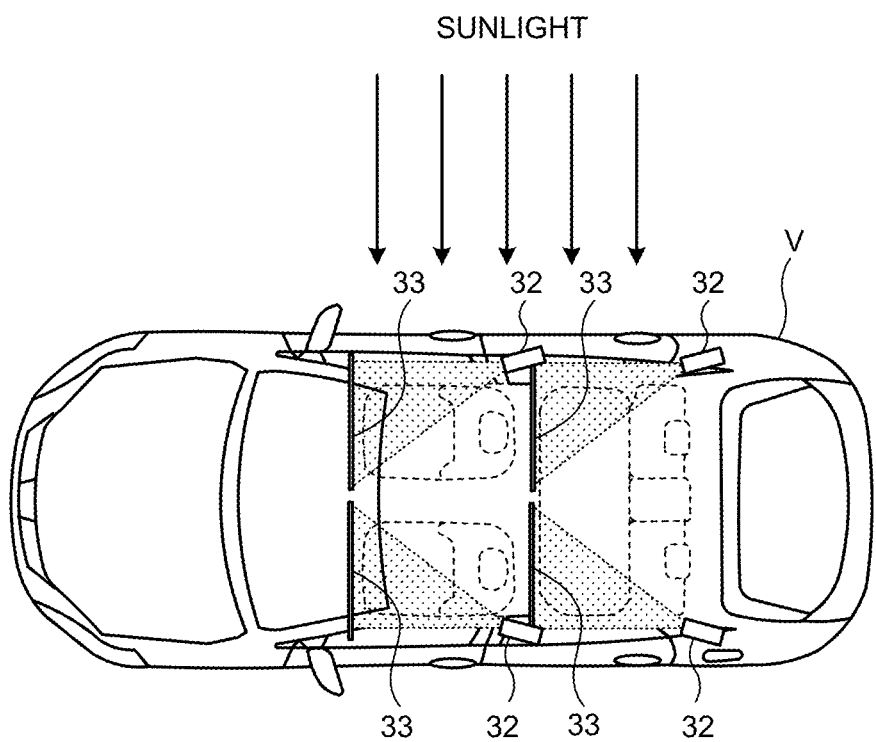
FIG. 33 is a diagram illustrating light-control/projection control based on sensor information.
Figure 34:
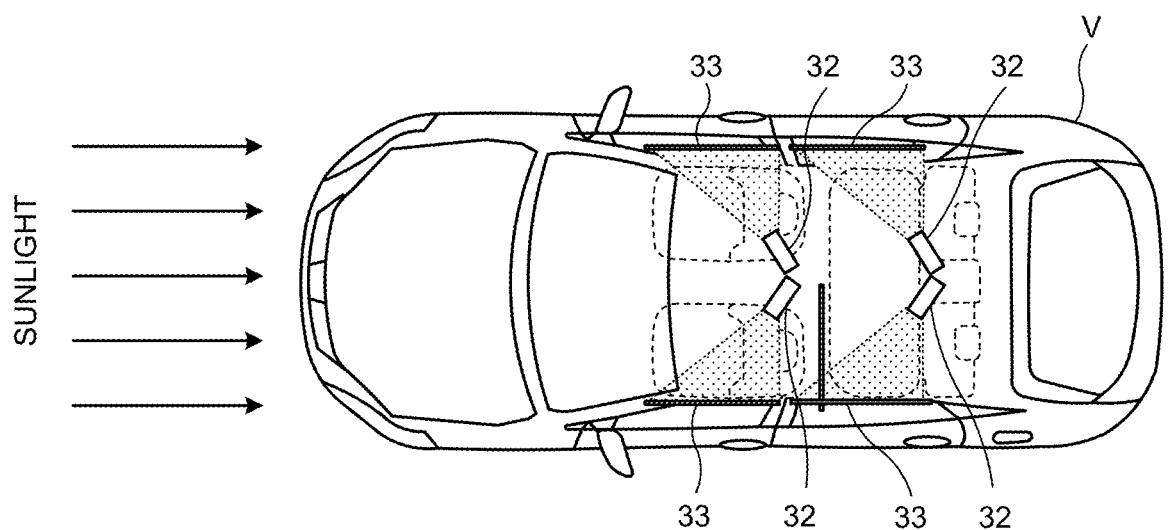
FIG. 34 is a diagram illustrating light-control/projection control based on sensor information.

Based on the detection result on light outside the mobile object, the analyzer 262 of the information processing device 20 determines a position of projection of content in the mobile object. For example, based on the result of detecting a direction of incidence of sunlight, the analyzer 262 determines a position of projection of content in the mobile object. FIGS. 33 and 34 are diagrams illustrating an example of the light-control/projection control based on sensor information. For example, when sunlight is incident from a side surface of the vehicle V, a position of projection is determined such that a projection surface of the hybrid screen 33 is oriented in the direction in which the vehicle V travels such that sunlight is not applied to the projection surface of the hybrid screen 33.

In that case, the analyzer 262 may determine a position of projection on the hybrid screen 33 based on the detection result on light outside the mobile object. When the hybrid screen 33 includes a plurality of hybrid screens in the mobile object, the analyzer 262 may determine, as a position of projection of content, at least one of the hybrid screens 33 that are selected from the hybrid screens 33 based on the detection result on light outside the mobile object. When the hybrid screen 33 includes a plurality of hybrid screens, the analyzer 262 determines a position of projection of content in the mobile object and determine positions of the hybrid screens 33 based on the position of projection. For example, a position in which the effect of external light is relatively small may be specified as the position of projection and the hybrid screen 33 may be moved to the specified position of projection. The hybrid screen 33 is movable by a drive system, such as a motor.

The detection result on external light is acquired based on information that is acquired from images captured by the illuminance sensor and a camera. For example, the illuminance sensor is installed around the hybrid screen 33 that is arranged in the mobile object. In this case, it is possible to sense an effect of external light on each hybrid screen 33. When there are a plurality of the hybrid screens 33, based on information that is acquired from the illuminance sensor, the hybrid screen 33 with relatively a small effect of external light is specified based on the detection result, and projects content onto the specified hybrid screen 33. This makes it possible to specify the hybrid screen 33 with a small effect of external light and project content.

In addition to the hybrid screen 33 in the mobile object, it is possible to install the hybrid screen 33 in a window. Light control on the hybrid screen 33 that is arranged on the window makes it possible to reduce the effect of external light, such as sunlight, when projecting content onto the hybrid screen 33 in the mobile object. Increasing the degree of light control on the hybrid screen 33 that is mounted on the window makes it possible to reduce the effect of the external light and thus perform projection without taking external light from the outside world into account.

When the hybrid screen 33 is arranged on the window, an upper limit may be set in the degree of light control on the hybrid screen 33 in consideration of ease of viewing the outside world. When there is an upper limit in light control, it is not possible to completely block the effect of external light on the inside of the mobile object and accordingly the external light has an effect on the hybrid screen 33 in the mobile object. In that case, the mobile object has the hybrid screens 33 inside and it is possible to specify the hybrid screen 33 with a small effect of external light based on information that is acquired from the surrounding illuminance sensor. The upper limit of the degree of light control may be determined according to the speed of the mobile object.

In that case, the acquisition unit 261 may determine a position of projection of content in the mobile object in consideration of the detection result on the person in the mobile object. For example, the analyzer 262 determines a position of projection of content in the mobile object based on a result of detecting a direction of incidence of light outside the object into the mobile object and a result of detecting a position of the person in the mobile object. For example, the analyzer 262 determines a position of content such that the position of content does not overlap the position of the sun when viewed from the person in the mobile object.

The analyzer 262 may sense whether projection is enabled at a given luminance based on the image captured by the illuminance sensor or the camera. A desired luminance is determined according to the performance of the projector and by a setting made by the user. When a desired luminance is determined according to the performance of the projector, a position of projection is determined based on comparison between a given illuminance and an illuminance that is sensed by the illuminance sensor.

The display controller 263 of the information processing device 20 performs control on projection of content onto the determined position of projection. For example, the display controller 263 controls projection of content onto the hybrid screen 33 in the mobile object.

It is possible to project content onto a specific optimum position while reducing the effect of external light in a specific direction in a direction of glare.

Control based on Detection Result on User

Projection control based on a detection result on users in the mobile object is conceivable as the light-control/projection control based on sensor information.

For example, the analyzer 262 specifies the number of and posture of users in the mobile object based on information from a sensor capable of detecting users in the mobile object, such as a TOF sensor. The analyzer 262 determines an appropriate position of projection of content based on the number of users. The display controller 263 performs control on projection of content onto the determined position of projection.

The analyzer 262 determines a position of projection of content based on a result of detection of a position of the user. For example, the analyzer 262 shifts projection to the front or a side near the position in which the user sits. The display controller 263 may switch projection using a plurality of the projectors 32 or change the direction of projection by performing control on pan, roll, shift, etc. The display controller 263 may make a projection in a wide covered area from the beginning and select an area of projection.

When there are multiple users in the mobile object, the analyzer 262 project content from the projector 32 onto the hybrid screens near the respective users. When the users view the same content, content is projected onto the hybrid screen 33 with short distances from the users. Thus, even when there are multiple users, it possible to project content onto a position such that each of the users easily views the content.

The analyzer 262 is also able to determine a position of projection based on the position of the user and the type of content to be projected. As for the type of content, content enabling interaction can be taken as content to be displayed on the hybrid screen 33. In the case of such content, a projection is made according to the position of the user onto the hybrid screen 33 in a position that is reached by a hand of the user.

Control Based on Detection of Interaction

Control based on detection of interaction is conceivable as the light-control/projection control based on sensor information.

Figure 35:
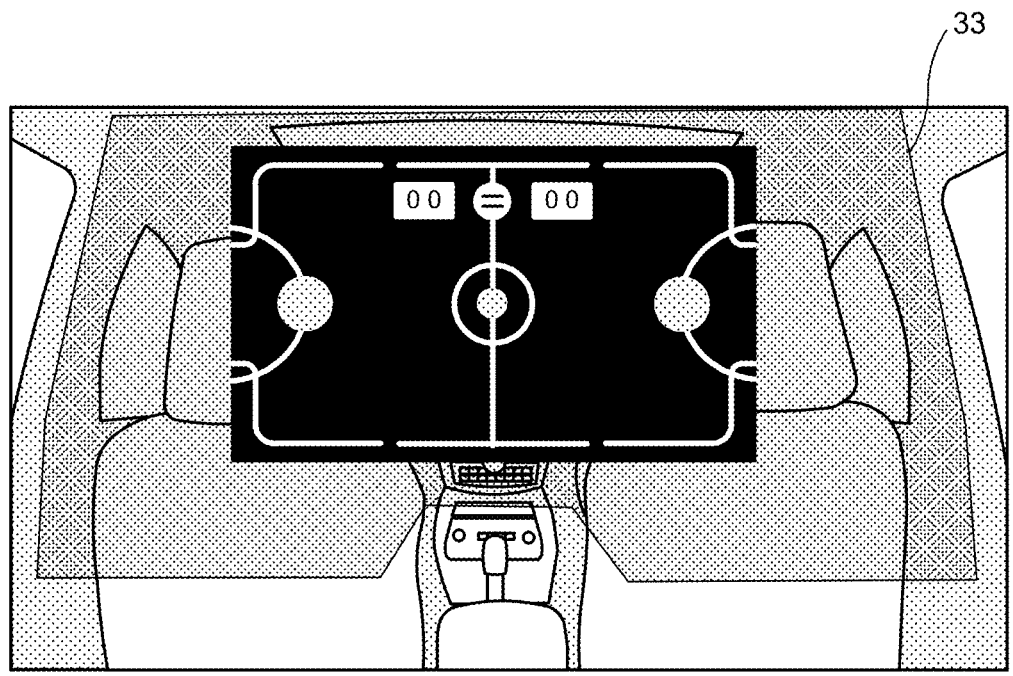
FIG. 35 is a diagram illustrating an example of displaying a game on the hybrid screen.

For example, the information processing device 20 may switch on/off a light control element when it is detected that the user touches a part without content. In that case, the information processing device 20 may be configured such that the user is able to operate the content by touching the content. In that case, touches may be enabled in multiple spots and simultaneous operations by multiple persons may be enabled. A multiplayer game, such as air hockey, may be enabled. For example, AR hockey (multi-touch applicable) is conceivable. FIG. 35 is a diagram illustrating an example of display of a game on the hybrid screen 33. A film touch pad may be used to recognize touches or a plurality of IR sensors may be arranged to recognize hand fingers based on shielding. Operations may be detected based on analysis by the image sensor.

Control Based on Impact Sensing

Control based on impact sensing is conceivable as the light-control/projection control based on sensor information.

For example, assume that the user is absorbed in a game that is displayed on the hybrid screen 33 and strongly hits around the headrest of the driver's seat. In this case, because there is a possibility that the driver would be distracted, the information processing device 20 stops projection of content onto the hybrid screen 33 when a direct and excessive impact against the hybrid screen 33 is sensed.

Specifically, the information processing device 20 may execute the following process.

Figure 36:
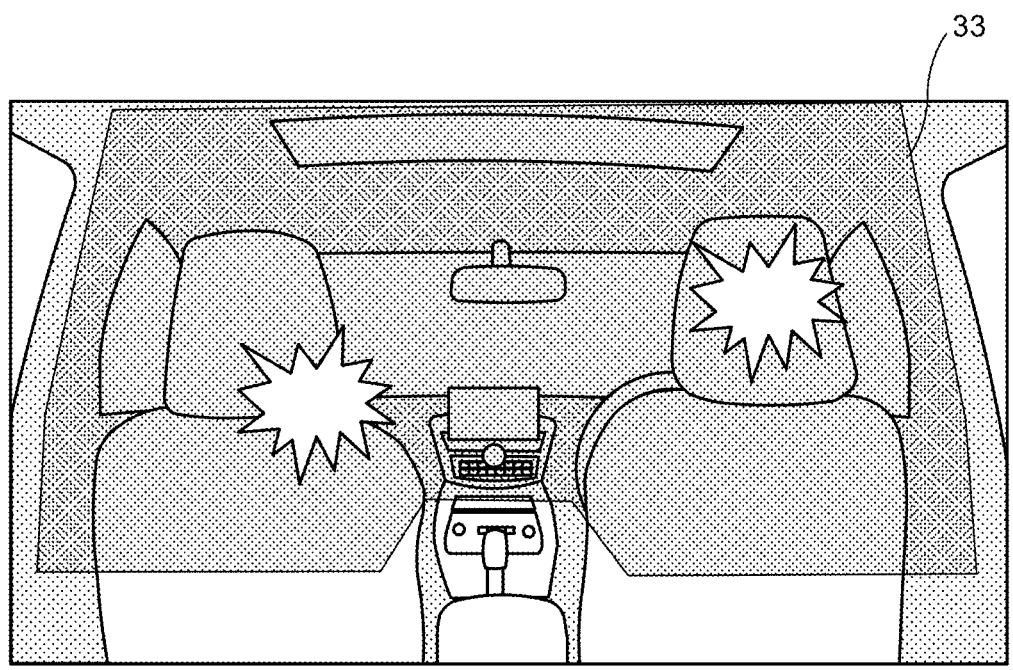
FIG. 36 is a diagram illustrating that an impact is applied to the hybrid screen.

For example, assume that the hybrid screen 33 is set between the front seats and the rear seats. The acquisition unit 261 acquires a detection result of the sensor that is set in the mobile object or on the hybrid screen 33. The sensor is an impact sensing sensor that senses an impact applied to the mobile object or the screen. An acceleration sensor or an imaging device is taken as the impact sensing sensor. The display controller 263 stops projection of content to the hybrid screen 33 based on the detection result of the sensor. FIG. 36 is a diagram illustrating that an impact is applied to the hybrid screen 33. For example, when the impact sensing sensor senses an impact on the hybrid screen, the display controller 263 stops projection of content to the hybrid screen 33. Alternatively, when the impact sensing sensor senses an impact on the mobile object (for example, a car), the display controller 263 stops projection of content to the hybrid screen 33.

The display controller 263 may perform control on light control on the hybrid screen 33 (for example, change the transmittance) based on the detection result of the sensor (for example, the impact sensing sensor). For example, when the impact sensing sensor senses an impact on the hybrid screen 33, the display controller 263 increases the hybrid screen 33 from the not-transmitting state to the transmitting state. Alternatively, when the impact sensing sensor senses an impact on the hybrid screen 33, the display controller 263 may increase the transmittance of the hybrid screen 33 by a given amount (for example, an increase by 20%). Alternatively, when the impact sensing sensor senses an impact on the mobile object (for example, a car), the display controller 263 may turn the hybrid screen 33 from the not-transmitting state to the transmitting state. Alternatively, when the impact sensing sensor senses an impact on the mobile object (for example, a car), the display controller 263 may increase the transmittance of the hybrid screen 33 by a given amount (for example by 20%). It is possible to increase safety.

Projection Control According to Acquisition of Information

Projection control according to information acquisition is conceivable as the light-control/projection control based on sensor information.

For example, the information processing device 20 acquires information on light outside the object and the interior and, based on the acquired information, controls light control on the hybrid screen 33 and projection of content onto the hybrid screen 33.

Projection Control According to Weather

Projection control according to the weather is conceivable as the light-control/projection control based on sensor information.

For example, the information processing device 20 dynamically controls the environment in the vehicle (projection video center) according to the weather. For example, the hybrid screen 33 is arranged on the glass on a side of the car. The information processing device 20 controls the hybrid screen 33 based on the result of detecting a weather. For example, the information processing device 20 controls projection onto the hybrid screen 33 such that it is raining outside but it is sunny inside, or there is a snow scenery outside but there is a southern island inside. The information processing device 20 may replace an expression of sunlight though the trees in a forest with a projection. The information processing device 20 may control light control on the hybrid screen 33 such that light outside the car is appropriately taken in.

Conversion of Scenery Using AR Technique

Conversion of scenery using the AR technology is conceivable as the light-control/projection control based on sensor information.

For example, the hybrid screen 33 is arranged on the glass of the side of the car. The information processing device 20 acquires a captured image of the outside of the car. Based on the captured image, the information processing device 20 controls projection of content onto the hybrid screen 33 such that the content is superimposed on a real object outside the car when viewed from the user. The information processing device 20 may acquire the result of detecting a position of the user in the car. Based on the information on the position of the user and the captured image, the information processing device 20 may control projection of content onto the hybrid screen 33 such that the content is superimposed onto a real object outside the car when viewed from the user. AR with high accuracy is enabled.

3-4. Light-Control/Projection Control in Consideration of Safety

Measures Against Drowsing

Countermeasures against drowsing is conceivable as light-control/projection control in consideration of safety.

Figure 37:
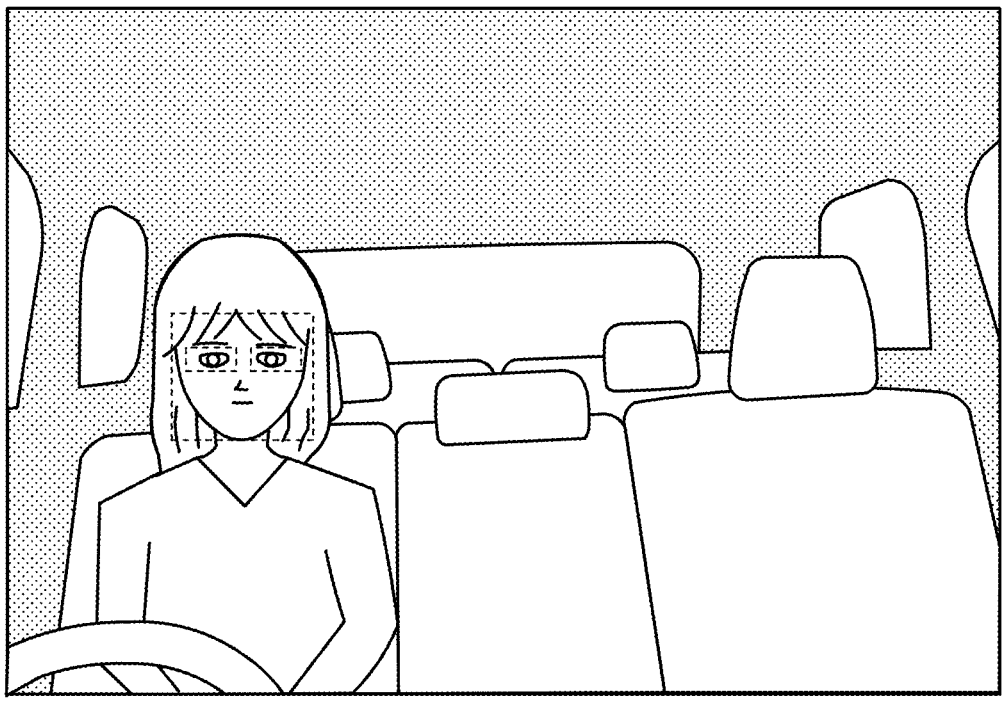
FIG. 37 is a diagram illustrating that circumstances of a driver is monitored with a camera for the inside of a car.

For example, the image display system 1 may record the circumstances of the driver with a video-see-through camera that is arranged on the side of the driver's seat. FIG. 37 is a diagram illustrating that the circumstances of the driver are monitored with a camera for the inside of the car. The information processing device 20 acquires images and analyzes whether the driver seems sleepy. When the driver is going to fall asleep, the information processing device 20 sets a mode of waking the driver. Issuing a warning with a speaker is conceivable as the awakening mode. The information processing device 20 may make a projection onto the hybrid screen 33 in a given position to issue a warning by light. The information processing device 20 may positively take external light in by releasing shielding of the hybrid screen 33, thereby causing the driver to be awake.

Dealing with Motion Sickness

A measure against motion thickness is conceivable as light-control/projection control in consideration of safety.

For example, the information processing device 20 controls projection of content onto the hybrid screen 33 such that vibrations of the mobile object (for example, a car) is canceled based on a user coordinate system or a world coordinate system. The information processing device 20 may controls projection of content onto the hybrid screen 33 such that vibrations of the mobile object (for example, a car) are canceled based on a result of detection of vibrations with an acceleration sensor.

Particulars of Drive Assistance

A dive assistance is conceivable as light-control/projection control in consideration of safety.

Figure 38:
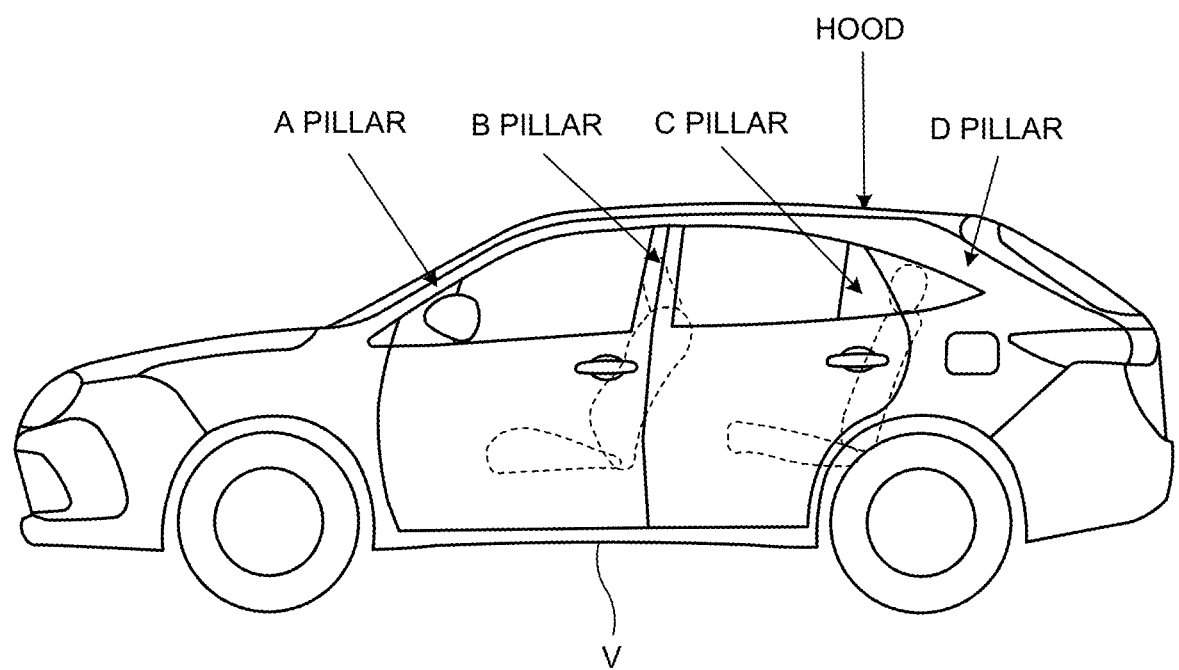
FIG. 38 is a diagram for describing each part of the car.

For example, the information processing device 20 acquires images of the outside that are captured in real time. The information processing device 20 removes blind areas of a pillar, the back of the bonnet and around the rear by AR. FIG. 38 is a diagram for describing each part of the car. The hybrid screen 33 may be arranged in each part of the car, such as the A pillar, to enable projection of an image. The information processing device 20 may reduce blind areas by projecting the backward view of the rear.

Particulars of Safety

The followings can be considered As light-control/projection control inconsideration of safety.

Figure 39:
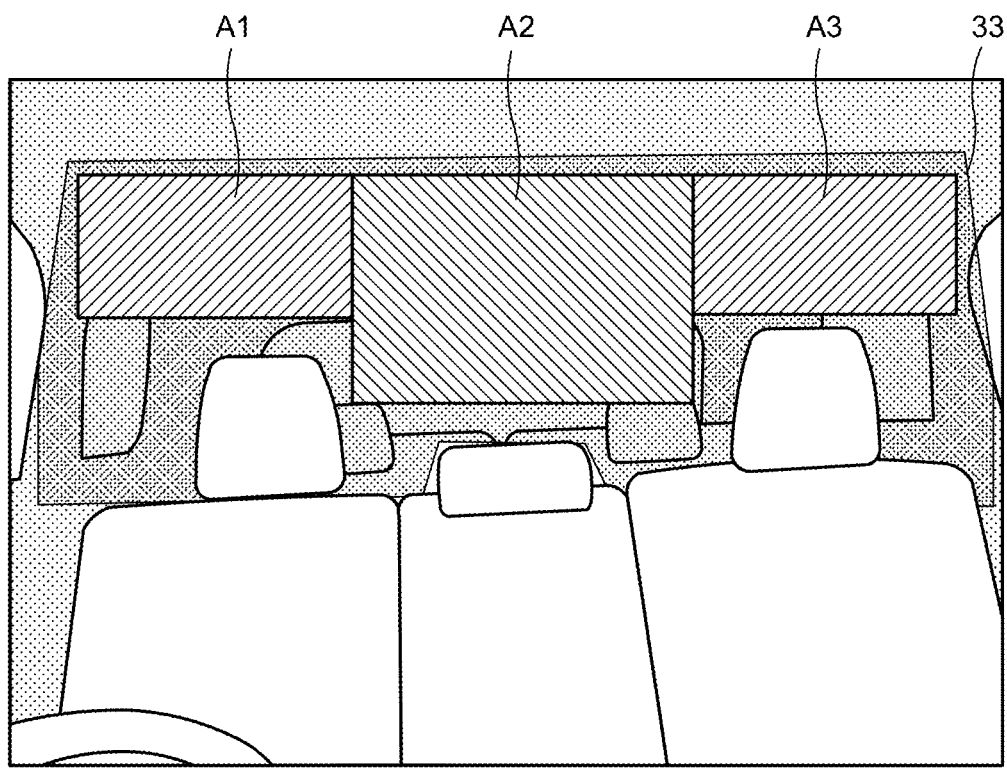
FIG. 39 is a diagram illustrating that content is projected onto a hybrid screen that is set between a front seat and a rear seat of the car.
Figure 40:
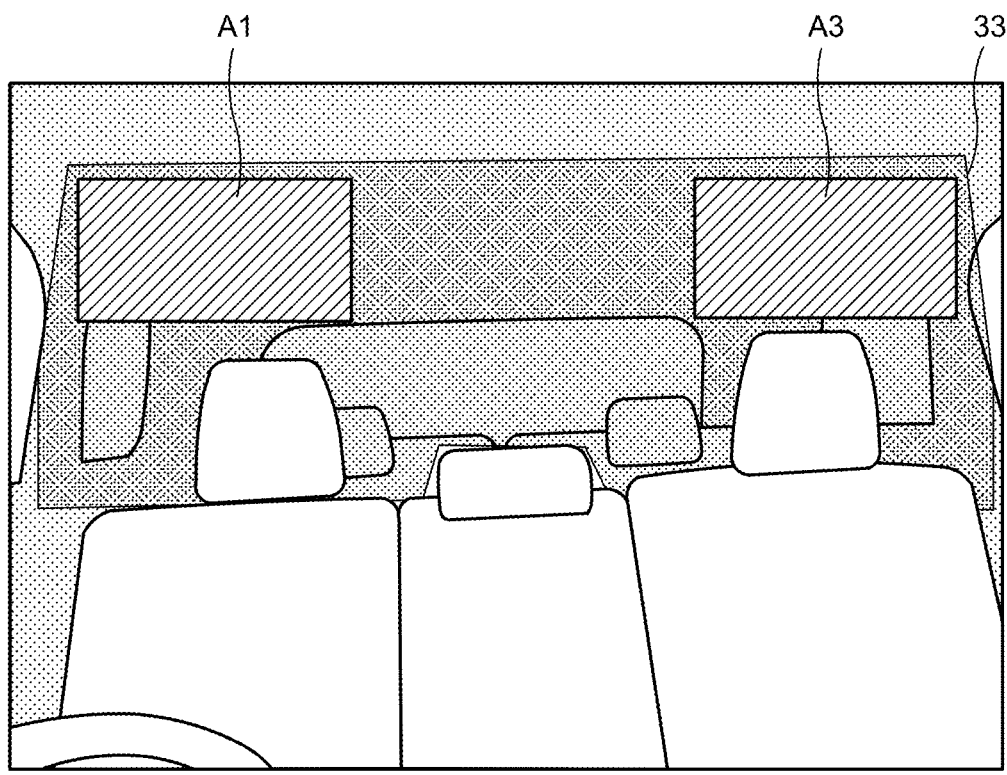
FIG. 40 is a diagram illustrating that content is projected onto a hybrid screen that is set between the front seat and the rear seat of the car.

For example, the information processing device 20 may make the screen between the driver's seat and the rear seat be transparent as required. FIG. 39 and FIG. 40 are diagrams illustrating that content is projected onto the hybrid screen 33 that is set between the front seats and the rear seats of the car. In the example in FIG. 39, content is projected onto areas A1 to A3. For example, when a distance sensor senses that the following car gets close, as illustrated in FIG. 40, the information processing device 20 stops projection of content onto the area A2 and keeps a rear view of the drier.

Note that the information processing device 20 may project a video in an area other than an area necessary for driving.

The information processing device 20 may change a video depending on the environment ahead the hybrid screen 33 and do not block the rear view of the driver.

The information processing device 20 may employ a camera video for only the rear field and superimpose the video on the display.

The information processing device 20 may change video projection according to the position of view (field of view) of the driver. In other words, the information processing device 20 may detect a point of gaze (direction of view) of the driver and make the point of gaze follow the position of video projection.

Figure 41:
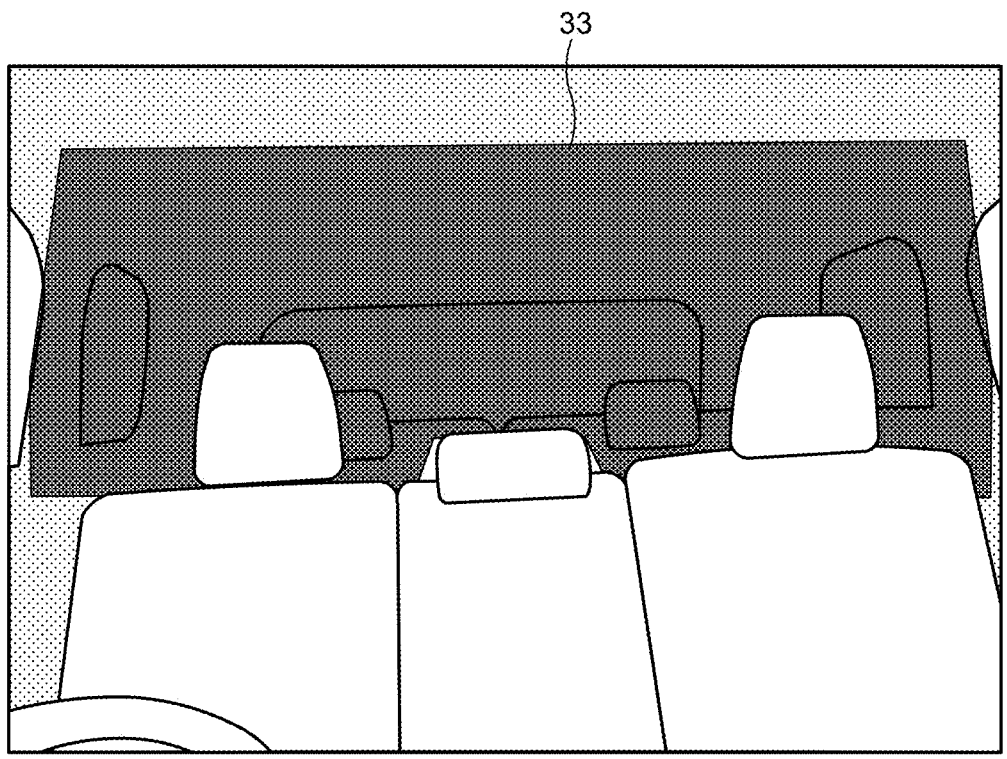
FIG. 41 is a diagram illustrating a hybrid screen in a light blocking state.
Figure 42:
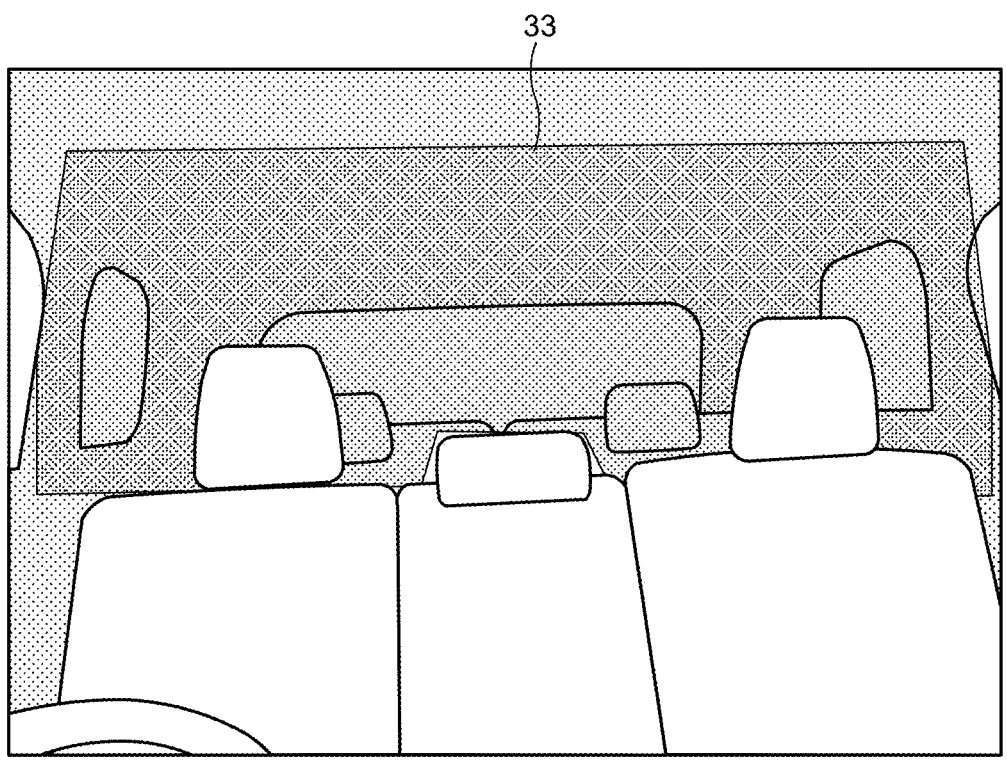
FIG. 42 is a diagram illustrating the hybrid screen in a transparent mode.

The information processing device 20 may maintain the hybrid screen 33 in the light blocking state (not-transmitting state) in autonomous driving as illustrated in FIG. 41 and, in a risky situation, turn the hybrid screen 33 into the transparent state (transmitting state) as illustrated in FIG. 42. In other words, the information processing device 20 may change the transparency of the hybrid screen 33 according to the external circumstances.

4. Specific Example of Process of Light-Control/Projection Control in Consideration of Safety A specific example of operations of the image display system 1 will be described next. Here, a specific example of a process of 3-4. Light-control/Projection Control in consideration of safety that is described above will be described next.

4-1. Overview

Replacing a conventional display that is arranged between the driver's seat and a rear seat with a transparent screen in a larger size and changing the position of an area of display of projection from the projector freely makes it possible to more effectively utilize the space in the car.

As described, however, when the light control element (for example, the light control element that the light control film 331 of the hybrid screen 33 includes) is driven in order to increase visibility of content that is displayed on the transparent screen, the larger the size of the display area is, the more largely the view of a user on the rear seat is blocked.

Figure 43:
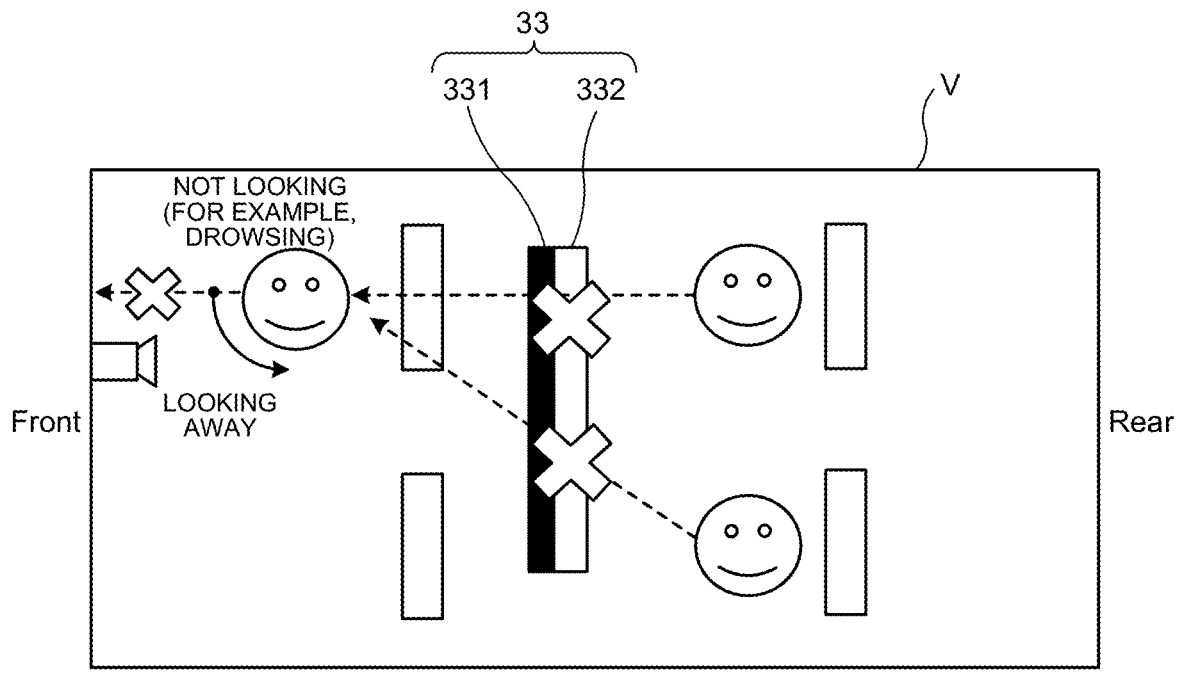
FIG. 43 is a diagram illustrating that a hybrid screen is set between front seats and rear seats of a car.

FIG. 43 is a diagram illustrating that the hybrid screen 33 is set between front seats and rear seats of the car. In the example in FIG. 43, light control is performed on the light control film 331 of the hybrid screen 33 in order to view the content and the hybrid screen 33 enters the black screen state (not-transmitting state). In this case, it is difficult for the users on the rear seats to check the state of the driver. Even when the driver cannot be concentrated on driving (for example, seems sleepy), there is a risk that the users on the rear seats cannot notice that.

Figure 44:
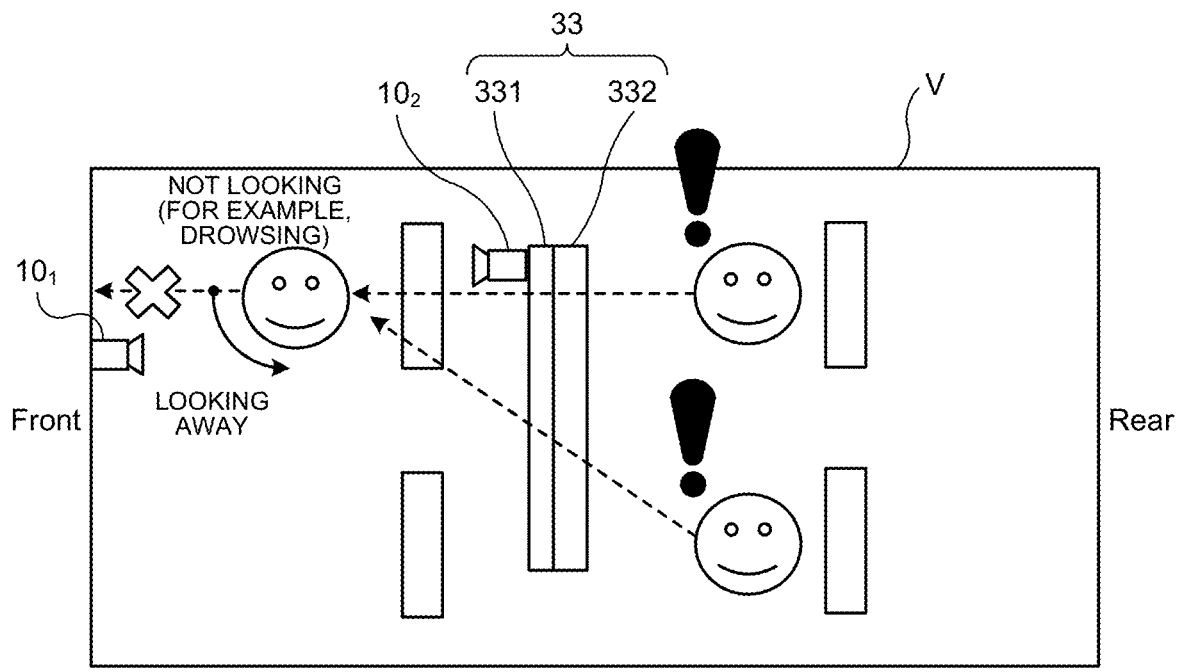
FIG. 44 is a diagram illustrating a specific example of a process of light-control/projection control considering safety.

Thus, with a sensor that is arranged on the side of the driver's seat, the state of forward gaze of the driver is detected. FIG. 44 is a diagram illustrating a specific example of the process of light-control/projection control in consideration of safety. In the example in FIG. 44, in order to detect the state of forward gaze of the driver, detection devices 101 and 102 are set ahead of and behind the driver's seat. The detection devices 101 and 102 are, for example, imaging devices including image sensors. More specifically, the detection device 101 is, for example, a dedicated camera that is set on the dashboard, or the like, and that captures images of the face of the driver and the detection device 102 is, for example, a dedicated camera that is set on the ceiling behind the driver's seat and that captures images of the head of the driver from the back.

Based on the detection results (captured images) of the detection devices 101 and 102, the information processing device 20 detects whether the driver is gazing forward. For example, the information processing device 20 acquires an image from the detection device 101 and detects (analyzes) the direction of gaze of the user from the acquired image. Accordingly, the information processing device 20 detects whether the driver is gazing forward. "When it is not detected that the driver is gazing forward", the information processing device 20 turns off the light control element (the light control film 331 in the example in FIG. 44) of the hybrid screen 33 that is set between the front seats and the rear seats, thereby turning the hybrid screen 33 into the transmitting state.

This enables the person on the rear seat to check the forward gazing state of the driver and thus, when the driver is in the not-gazing state, the person on the rear seat is able to take an action, such as speaking to the driver. As a result, the image display system 1 contributes to safety.

4-2. Process Flow

Figure 45:
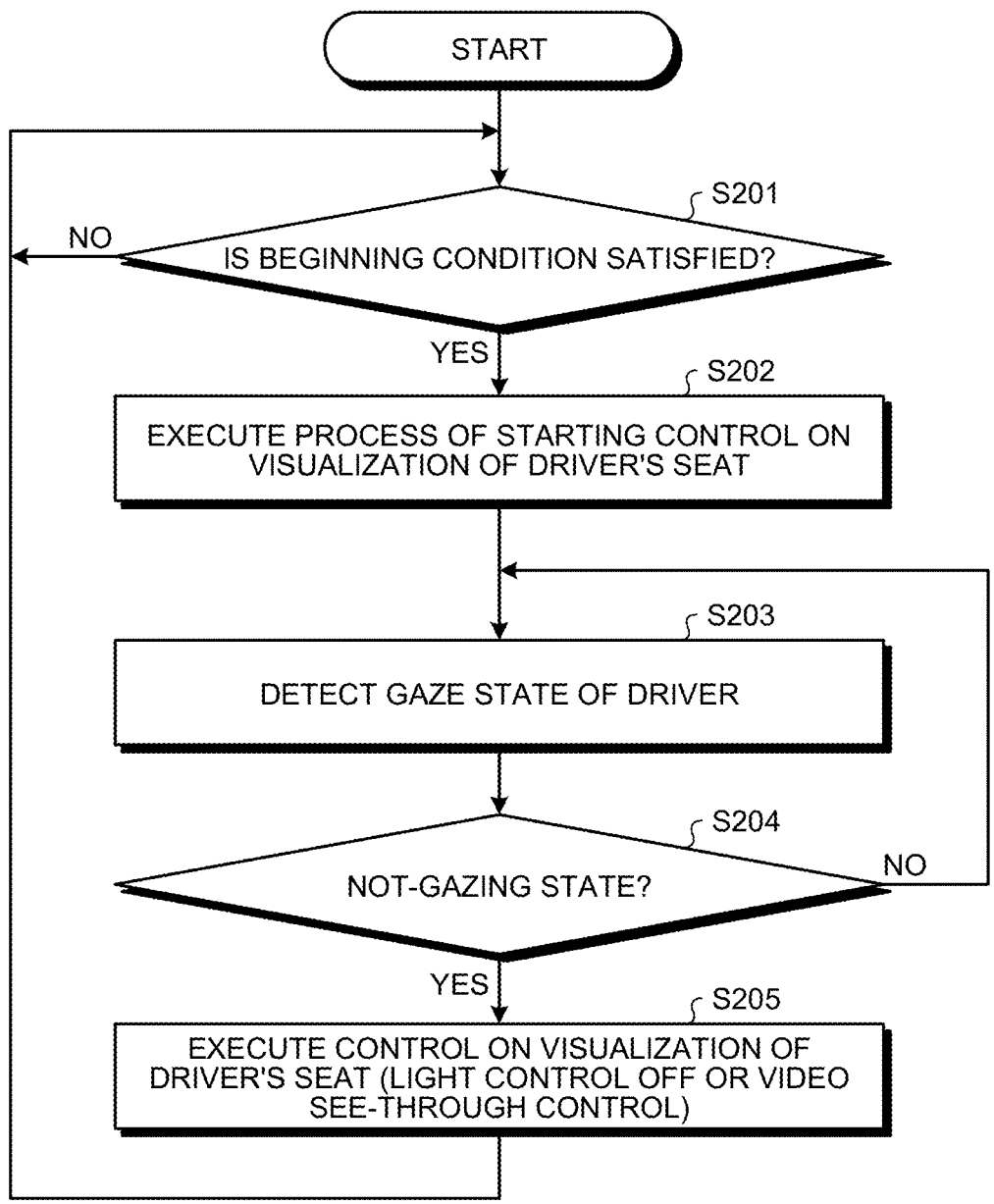
FIG. 45 is a flowchart illustrating a visualization control process according to the embodiment of the disclosure.

FIG. 45 is a flowchart illustrating a visualization control process according to the embodiment of the disclosure. The visualization control process illustrated in FIG. 45 is executed, for example, when the image display system 1 (for example, the information processing device 20) executes the above-described image display process. The visualization control process to be presented below is executed by the controller 26 of the information processing device 20 in parallel with the image display process. The visualization control process to be presented below may be regarded as a process to be executed at step S104 of the above-described image display process. The visualization control process will be described below with reference to FIG. 45.

First of all, the controller 26 of the information processing device 20 determine whether a beginning condition is satisfied (step S201). For example, the controller 26 determines whether the start condition presented at step S101 of the image display process described above is satisfied.

When the beginning condition is not satisfied (step S201: NO), the controller 26 repeats step S201 until the beginning condition is satisfied. When the beginning condition is satisfied (step S201: YES), the controller 26 executes a process of beginning control on visualizing the driver's seat (step S202). For example, the controller 26 executes a process of initializing a program and starts the detection device 10 (for example, the imaging devices that are set in front of or behind the driver's seat).

When the beginning process completes, the controller 26 detects a gaze state of the driver (step S203). For example, the acquisition unit 261 of the information processing device 20 acquires a detection result (for example, a captured image) of the detection device 10. Based on the detection result of the detection device 10 (for example, the captured image), the analyzer 262 of the information processing device 20 determines (analyzes) whether the driver is gazing forward.

For example, assume that the detection device 10 is a dedicated camera that is set on the dashboard, or the like, and that captures an image of the face of the driver. The analyzer 262 may detect (analyze) the gaze direction of the user from the image that is acquired from the dedicated camera. The analyzer 262 may detect (analyze) whether the driver is gazing forward based on the direction of gaze of the driver.

The detection device 10 may be a sensor (for example, a camera) that is set on the back surface of the hybrid screen 33 (on the side of the driver's seat) and that detects a state of the driver. The analyzer 262 may estimate a direction of gaze of the driver based on the orientation or motion of the head of the driver that are detected from the sensor (for example, a camera).

The controller 26 determines whether the driver is in the not-gazing state based on the result of detection at step S203 (step S204). For example, when at least any one of the following conditions is satisfied, the controller 26 may determine that it is the "not-gazing state".

Condition 1: The gaze of the driver cannot be detected (for example, closure of the eyes is detected or there is an error in detecting a gaze on the system).

Condition 2: It is detected that the gaze of the driver is "in a direction other than the forward direction".

According to the determination, in any condition in which the system does not recognize that the driver is gazing forward appropriately, control on visualizing the driver's seat (the process at step S205 to be described below) is executed. In other words, even when there is no abnormality on the driver's side actually, the information processing device 20 stops provision of content. As a result, securing safety in the state where the vehicle is driven is performed preferentially to provision of content. In other words, the information processing device 20 executes fail-safe control.

When the driver is not in the not-gazing state (step S204: NO), the controller 26 returns to step S203. When the driver is in the not-gazing state (step S204: YES), that is, when the controller 26 "cannot recognize that the driver is in the gazing state", the display controller 263 of the information processing device 20 executes control on visualizing the driver's seat (step S205). For example, the display controller 263 performs light control OFF (control) or video see-through control.

"Light control OFF (control)" means "restricting light-control control in a normal state in which visualization control is not performed and increasing the transmittance of the hybrid screen 33". The transmittance of the light control element may be changed to approximately 100%. Alternatively, the transmittance of the light control element may be increased from the current transmittance by only a given amount (for example 20%). The light control element in the example may be a light control element that cannot be driven partially, that is, a light control element that collectively performs light control over the surface.

The "Video see-through control" means control of displaying a video of the side of the driver's seat on the hybrid screen 33. The video of the side of the driver's seat may be acquired by a camera, or the like, that is set on the back side of the hybrid screen 33 (on the driver's seat side). As described in the example in FIG. 44, a forward view image that is acquired by the detection device 102 may be projected onto the hybrid screen 33. Accordingly, a video see-through image is provided to the users on the rear seats. Note that, during projection of content, the video see-through image may be projected onto the outside of a display area onto which content is projected.

Note that, depending on the features of the light control element that is used, there is a possibility that it would take time to increase the transmittance of the light control element by a given amount. In such a case, providing a video see-though image is effective in view of instantaneousness.

Figure 46:
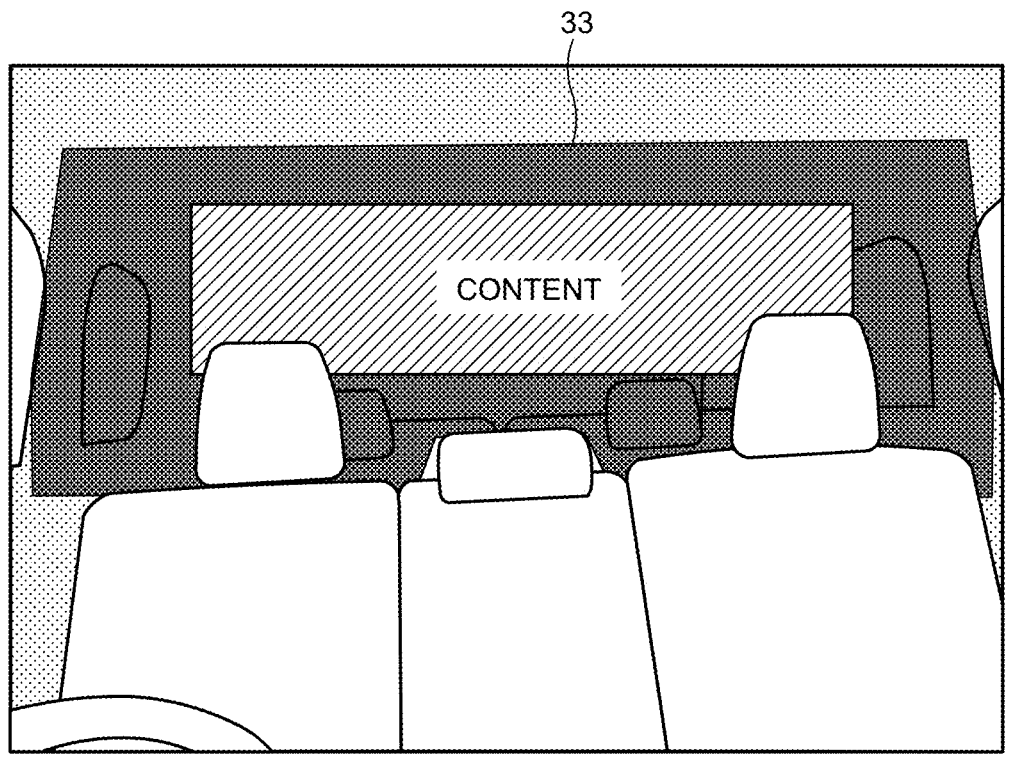
FIG. 46 is a diagram illustrating a video see-through control image.
Figure 47:
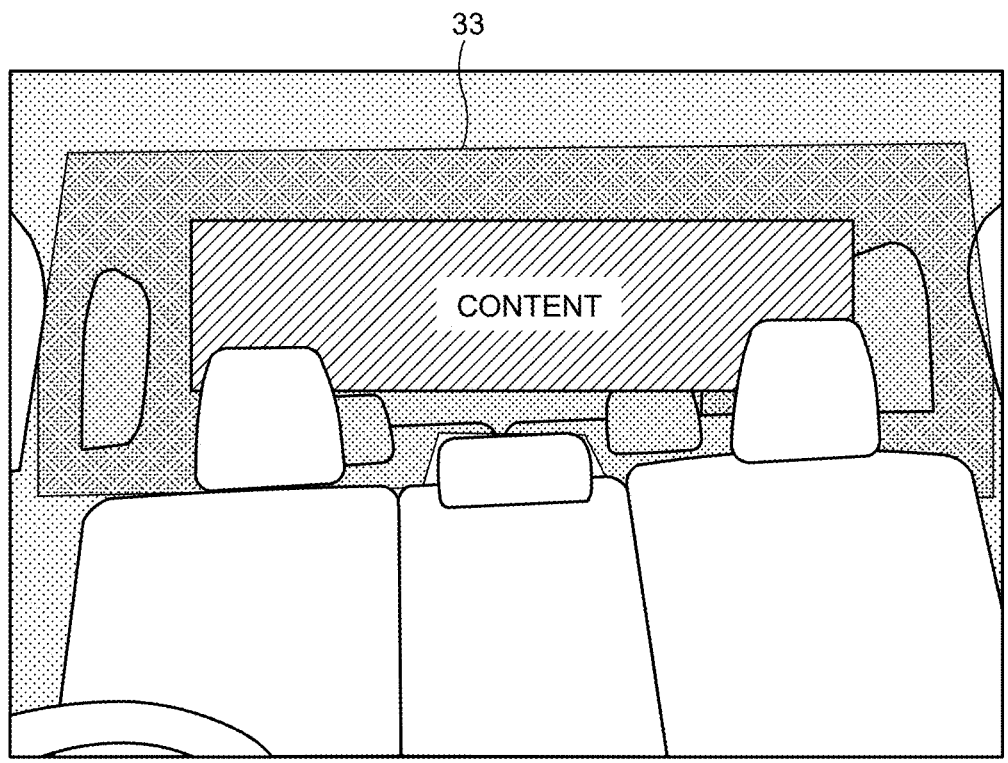
FIG. 47 is a diagram illustrating a video see-through control image.

FIGS. 46 and 47 are diagrams illustrating a video see-though control image. The transmittance of the hybrid screen 33 differs between FIG. 46 and FIG. 47. The hatched part in the drawing corresponds to the area onto which a video see-through image is projected. The video that is acquired by the camera is projected onto the hatched part in the drawing. When a video see-through image is projected onto the hybrid screen 33, the transmittance of the light control element need not be changed. Thus, visibility of content is maintained substantially.

When control on visualizing the driver's seat ends, the controller 26 returns to step S101 and waits until the start condition is satisfied.

4-3. Effect of Example

According to the series of processes descried above, when the system cannot recognize the gazing state of the side of the driver's seat, the system substantially prevents the users on the rear seats from viewing the content by turning light control off or video see-through control. Accordingly, the users on the rear seats are able to notice the state of the side of driver's seat. Accordingly, it is possible to inhibit the user on the rear seat from missing an abnormality of the driver, such as sickness (including drowsing) of the driver or looking away.

5. Modification

Each embodiment described above represents an example only and various changes and applications can be made.

5-1. Modification of System Configuration

For example, in the embodiment described above, the image display system 1 includes the hybrid screen 33, and the image display system 1 may simply include only a transparent screen without a light control function. In this case, the above-described "hybrid screen 33" is replaceable with "transparent screen" as appropriate. Note that the hybrid screen 33 having the light control function is also one type of transparent screen.

The hybrid screen 33 may be configured to be transparent in a state where power supply is stopped. When some sort of accident occurs, the hybrid screen 33 turns to be transparent and therefore, even when the hybrid screen 33 is set on a mobile object, driving safety can be ensured.

When an accident occurs with the hybrid screen 33 being in the not-transmitting state, it is assumed that the hybrid screen 33 would remain in the not-transmitting state. The hybrid screen 33 may include a battery (for example, a super capacitor) that is used for a process for returning to the transparent state in order for the hybrid screen 33 to return to the transparent state after an accident. It is possible to further increase safety.

In the above-described embodiment, the mobile object in which the image display system 1 according to the above-described embodiment is set is mainly an automobile, but the mobile object in which the image display system 1 is set is not limited to automobiles. For example, the mobile object on which the image display system 1 is set may be a train, such as a bullet train.

In the case of a chair facing in the travel direction like that in a bullet train, when content is projection to a window, a user has difficulty in viewing the content. In this case, the image display system 1 may be configured such that the hybrid screen 33 lowers when necessary.

In the case of a linear motor car, using windows is extremely effective. The hybrid screen 33 may be set on a window of a linear motor car and content may be projected.

The hybrid screen 33 may be set on a window of a subway car and a tourist information display, etc., may be made. In a subway car, seats are often arranged in parallel with windows on the sides. Even when the user is sitting on a seat, the user is able to view content on an opposed window when the opposed seat is empty.

The mobile object in which the image display system 1 is set may be configured such that the entire surface of the interior serves as a screen. Projecting a video of the outside the mobile object onto the screen on the entire surface enables provision of experiencing as if the boundary between the mobile object and the outside of the mobile object is removed. Applying the modification to an airplane enables provision of experiencing as if the user is floating in the sky.

The mobile object in which the image display system 1 is set may be an automobile capable of autonomous driving. It is supposed that a fully autonomous driving era would be back to the era of horse-drawn carriages. In other words, a person on board need not drive and AI serves as a coachman. It is supposed that all passengers on board are opposed to each other as on the rear seats in a limousine, which will be taken for granted. Thus, it is supposed that it is possible to fully rent a room that is fully layout and that is highly customized according to people on board or a flat panel and a projector can be arranged freely. In other words, it is possible to arrange the hybrid screen 33 freely. The hybrid screen 33 makes it possible to keep people on board from noticing descending and ascending slope. It is also supposed that, during autonomous driving, a user is able to take various actions. For example, it is supposed that it is possible to perform gym training, massage, and bathing. In such a case, providing information to the user with the hybrid screen 33 makes it possible to provide a preferable viewing environment to the user.

Figure 48:
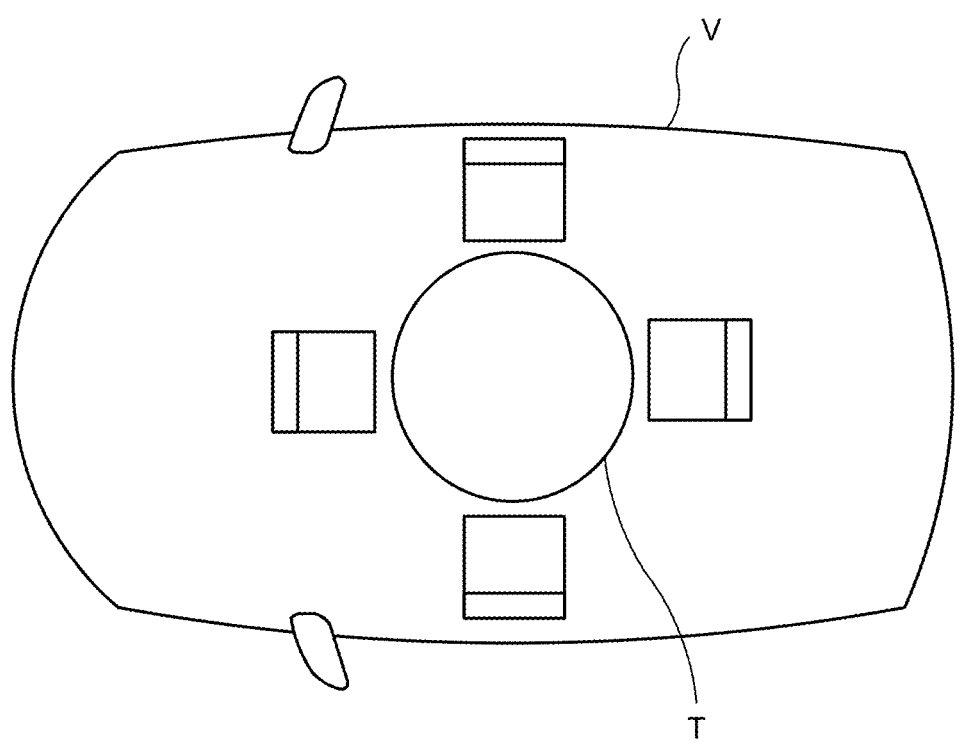
FIG. 48 is a diagram illustrating an example of a car with a layout in which a round table T is surrounded.

It is supposed that free layout of an automobile is enabled in the autonomous driving era. For this reason, even in a vehicle with a limited space, various types of treating are enabled. For example, as illustrated in FIG. 48, it is supposed that a layout of a car V is enabled such that a round table is surrounded. Note that, for safety, in general, it is supposed that a user sits in a travel direction. It is supposed that this is because sitting in a direction opposite to the travel direction tends to lead to motion thickness, because there is a window, or because acceleration is opposite. Controlling for tendency of not having motion thickness using a video on the hybrid screen 33 enables further free layout. Enabling control for tendency of not having motion thickness using a video on the hybrid screen 33 makes it possible to realize, for city commuters, further free layout, such as layout of chairs according to preference of the user, is enabled before the vehicle is allocated.

5-2. Other Modification

A control device that controls the detection device 10, the information processing device 20, or the image display device 30 may be implemented using a dedicate computer system or may be implemented using a general-purpose computer system.

A program for executing the above-described operations is stored in a computer-readable recording medium, such as an optical disk, a semiconductor memory, a magnetic tape, or a flexible disc and is distributed. For example, the program is installed in a computer and the above-described process is executed, thereby configuring the control device. The control device may be a device (for example, a personal computer) outside the detection device 10, the information processing device 20 or the image display device 30. The control device may be a device (for example, the controller 13, the controller 26, or the like) inside the detection device 10, the information processing device 20 or the image display device 30.

The communication program described above may be stored in a disk device that a server device on a network, such as the Internet, includes and may be downloaded to a computer. The above-described functions may be implemented by cooperation between an OS (Operating System) and application software. In this case, parts other than the OS may be stored in a medium and may be distributed or parts other than the OS may be stored in the server device such that the parts are downloadable, etc.

Among the processes described in the above-described embodiment, all or part of the process that is described as one performed automatically can be performed manually or all or part of the process that has been described as one performed manually can be performed automatically by a known method. In addition, information including the procedure, specific names, and information including various types of data and parameters that are presented in the above description and the drawings are changeable freely unless particularly noted. For example, various types of information illustrated in each drawing is not limited to the information illustrated in the drawing.

Each component of each device illustrated in the drawings is a functional idea and need not necessarily be configured physically as illustrated in the drawings. In other words, specific modes of dispersion and integration of devices are not limited to those illustrated in the drawings, and all or part of the devices can be configured by functional or physical distribution or integration in any unit according to various types of load and usage.

As for the embodiment described above, an appropriate combination can be made in a range without inconsistency in the process content. The order of steps illustrated in the sequence chart or the flowchart of the present embodiment is changeable.

For example, the present embodiment can be also carried out in any form configuring the device or system, for example, a processor serving as a system LSI (Large Sale Integration), a module using multiple processors, a unit using multiple modules, a set obtained by further adding another function to the unit, or the like (in other words, part of the configuration of the device).

Note that, in the embodiment, the system means an assembly of multiple components (a device, a module (parts), etc.), and whether all components are in the same casing does not matter. Thus, multiple devices that are housed in separate casings and that are connected via a network and a single device including multiple modules housed in a single casing are both systems.

For example, the present embodiment can employ a configuration of cloud computing in which multiple devices share a single function via a network and cooperatively perform processing.

6. Conclusion

As described above, according to the embodiment of the disclosure, the information processing device 20 acquires a detection result on light outside a mobile object and, based on the acquired detection result, determines a position of projection of content in the mobile object. The information processing device 20 performs control on projection of content onto the determined position of projection. Accordingly, for example, because it is possible to avoid backlight, or the like, the information processing device 20 is able to provide a preferable viewing environment to a person on the mobile object.

The effects described herein are exemplarily presented only and are not definitive, and there may be other effects.

Embodiments of the disclosure are not limited to the embodiment described above, and various changes can be made without departing from the scope of the disclosure.

The disclosure can also employ the configurations below.

(1)
An information processing device comprising:
an acquisition unit configured to acquire a detection result on light outside a mobile object;
an analyzer configured to determine a position of projection of content in the mobile object based on the detection result on the light outside the mobile object; and
a display controller configured to perform control on projection of the content onto the determined position of projection.

(2)
The information processing device according to (1), wherein the analyzer is configured to determine the position of projection of the content in the mobile object based on the detection result on the light outside the mobile object and a detection result on a person in the mobile object.

(3)
The information processing device according to (2), wherein the analyzer is configured to determine the position of projection of the content in the mobile object based on a result of detecting a direction of incidence of the light outside the object on the mobile object and a result of detecting a position of the person in the mobile object.

(4)
The information processing device according to any one of (1) to (3), wherein the display controller is configured to control projection of the content onto at least one screen in the mobile object.

(5)
The information processing device according to (4), wherein the analyzer is configured to determine a position of projection on the screen based on the detection result on the light outside the mobile object.

(6)
The information processing device according to (4), wherein
the screen includes a plurality of screens, and
the analyzer is configured to determine at least one screen that is selected from the screens as the position of projection of the content based on the detection result on the light outside the mobile object.

(7)
The information processing device according to (4), wherein
the screen is movable in the mobile object,
the analyzer is configured to determine the position of projection of content in the mobile object based on the detection result on the light outside the mobile object and determine a position of the screen based on the position of projection, and
the display controller is configured to move the screen to the determined position.

(8)
The information processing device according to (4), wherein
the screen is movable in the mobile object,
the acquisition unit is configured to acquire information on a position of the screen, and
the analyzer is configured to shift the position of projection according to a shift in the position of the screen.

(9)
The information processing device according to any one of (4) to (8), wherein
the screen is a transparent screen,
the acquisition unit is configured to acquire a result of detection by a sensor that is set in the mobile object or on the screen, and
the display controller is configured to stop projection of the content onto the transparent screen based on the result of detection by the sensor.

(10)
The information processing device according to (9), wherein
the mobile object is a car,
the screen is set between a front seat and a rear seat of the car,
the sensor is an impact sensing sensor configured to sense an impact that is applied to the car or the screen, and
the display controller is configured to stop projection of the content onto the transparent screen when the impact sensing sensor senses an impact.

(11)
The information processing device according to (9) or (10), wherein
the mobile object is a car,
the screen is set between a front seat and a rear seat of the car,
the sensor is a camera that captures an image of a driver on a driver's seat, and
the display controller is configured to stop projection of the content to the transparent screen when the camera senses a not-gazing state of the driver.

(12)
The information processing device according to any one of (4) to (11), wherein
the screen is a transparent screen whose transmittance is changeable,
the acquisition unit is configured to acquire a result of detection by a sensor that is set in the mobile object or on the screen, and
the display controller is configured to change the transmittance of the transparent screen based on the result of detection by the sensor.

(13)
The information processing device according to (12), wherein
the mobile object is a car,
the screen is set between a front seat and a rear seat of the car,
the sensor is an impact sensing sensor configured to sense an impact that is applied to the car or the screen, and
the display controller is configured to increase the transmittance of the transparent screen when the impact sensing sensor senses an impact.

(14)
The information processing device according to (12) or (13), wherein
the mobile object is a car,
the screen is set between a front seat and a rear seat of the car,
the sensor is a camera configured to capture an image of a driver on a driver's seat, and
the display controller is configured to increase the transmittance of the transparent screen when the camera senses a not-gazing state of the driver.

(15)
The information processing device according to any one of (4) to (14), wherein
the mobile object is a car,
the screen is set between a front seat and a rear seat of the car,
the acquisition unit is configured to acquire a result of detection by a sensor that is set in the mobile object or on the screen and acquire a video see-through image on a side of the front seat, and
the display controller is configured to project the video see-through image on an area outside a display area onto which the content is projected on the screen when the sensor senses a not-gazing state of a driver during projection of the content onto the screen.

(16)
An information processing method comprising:
acquiring a detection result on light outside a mobile object;
determining a position of projection of content in the mobile object based on the detection result on the light outside the mobile object; and
controlling projection of the content onto the determined position of projection.

(17)
An information processing program for causing a computer to function as
an acquisition unit configured to acquire a detection result on light outside a mobile object;
an analyzer configured to determine a position of projection of content in the mobile object based on the detection result on the light outside the mobile object; and
a display controller configured to control projection of the content onto the determined position of projection.

REFERENCE SIGNS LIST

1 IMAGE DISPLAY SYSTEM
10 DETECTION DEVICE
11, 21 COMMUNICATION UNIT
12 SENSOR UNIT
13 CONTROLLER
20 INFORMATION PROCESSING DEVICE
22 INPUT UNIT
23 SENSING UNIT
24 STORAGE
25 NETWORK COMMUNICATION UNIT
26 CONTROLLER
261 ACQUISITION UNIT
262 ANALYZER
263 DISPLAY CONTROLLER
30 IMAGE DISPLAY DEVICE
31 PAN-TILT UNIT
32 PROJECTOR
33 HYBRID SCREEN
331 LIGHT CONTROL FILM
332 TRANSPARENT SCREEN
333 SURFACE REFLECTIVE MIRROR

The invention claimed is:

1. An information processing-device system, comprising:
a sensor unit configured to detect a state of a mobile object, wherein
the state of the mobile object corresponds to an environment of the mobile object,
the sensor unit includes an illuminance sensor, and
the illuminance sensor is configured to:
detect light outside the mobile object; and
capture a first image associated with the detected light;
an acquisition unit configured to acquire a first detection result based on the detected light and the captured first image;
an analyzer configured to:
determine a first position of projection of content in the mobile object, based on the first detection result; and
determine a specific position of a screen in the mobile object based on the first position of the projection, wherein
the screen is movable in the mobile object; and
a display controller configured to:
move the screen to the determined specific position;
control the projection of the content onto the determined first position;
control the projection of the content onto the screen in the mobile object; and
change a transmittance of the screen that includes a light control film.

2. The information processing system according to claim 1, wherein
the acquisition unit is further configured to acquire a second detection result associated with a person in the mobile object, and
the analyzer is further configured to determine the first position of the projection of the content in the mobile object, based on the first detection result and the second detection result.

3. The information processing system according to claim 2, wherein the analyzer is further configured to determine the first position of the projection of the content in the mobile object, based on a direction of incidence of the detected light and a position of the person in the mobile object.

4. An information processing method, comprising:
detecting a state of a mobile object, wherein the state of the mobile object corresponds to an environment of the mobile object;
detecting light outside the mobile object;
capturing an image associated with the detected light;
acquiring a detection result based on the detected light and the captured image;

determining a position of projection of content in the mobile object, based on the detection result;

determining a specific position of a screen in the mobile object based on the position of the projection, wherein the screen is movable in the mobile object;

moving the screen to the determined specific position;

controlling the projection of the content onto the determined position;

controlling the projection of the content onto the screen in the mobile object; and changing a transmittance of the screen that includes a light control film.

5. The information processing system according to claim 1, wherein the analyzer is further configured to determine a second position of the projection of the content on the screen based on the first detection result.

6. The information processing system according to claim 5, wherein
the screen includes a plurality of sub-screens, and
the analyzer is further configured to determine, as the second position of the projection of the content, a sub-screen of the plurality of sub-screens based on the first detection result.

7. A non-transitory computer-readable medium having stored thereon, computer-executable instructions which, when executed by a computer, cause the computer to execute operations, the operations comprising:
detecting a state of a mobile object, wherein the state of the mobile object corresponds to an environment of the mobile object;
detecting light outside the mobile object;
capturing an image associated with the detected light;
acquiring a detection result based on the detected light and the captured image;
determining a position of projection of content in the mobile object, based on the detection result;
determining a specific position of a screen in the mobile object based on the position of the projection, wherein the screen is movable in the mobile object;
moving the screen to the determined specific position;
controlling the projection of the content onto the determined position;
controlling the projection of the content onto the screen in the mobile object; and
changing a transmittance of the screen that includes a light control film.

8. The information processing system according to claim 1, wherein
the acquisition unit is further configured to acquire information on the specific position of the screen, and
the analyzer is further configured to shift the first position of the projection, based on a shift in the specific position of the screen.

9. The information processing system according to claim 1, wherein
the screen is a transparent screen,
the sensor unit further includes a specific sensor,
the acquisition unit is further configured to acquire a result of detection by the specific sensor in one of the mobile object or on the screen, and
the display controller is further configured to stop the projection of the content onto the transparent screen based on the result of detection by specific sensor.

10. The information processing system according to claim 9, wherein
the mobile object is a car,
the screen is between a front seat of the car and a rear seat of the car,
the specific sensor is an impact sensing sensor,
the impact sensing sensor is configured to sense an impact applied to one of the car or the screen, and
the display controller is further configured to stop the projection of the content onto the transparent screen, based on the sensed impact.

11. The information processing system according to claim 9, wherein
the mobile object is a car,
the screen is between a front seat of the car and a rear seat of the car,
the specific sensor is a camera,
the camera is configured to:
capture a second image associated with a driver on a driver seat; and
sense a not-gazing state of the driver, and
the display controller is further configured to stop the projection of the content onto the transparent screen, based on the not-gazing state of the driver.

12. The information processing system according to claim 1, wherein
the screen is a transparent screen,
the sensor unit further includes a specific sensor,
the acquisition unit is further configured to acquire a result of detection by the specific sensor in one of the mobile object or on the screen, and
the display controller is further configured to change the transmittance of the screen based on the result of detection by the specific sensor.

13. The information processing system according to claim 12, wherein
the mobile object is a car,
the screen is set between a front seat of the car and a rear seat of the car,
the specific sensor is an impact sensing sensor,
the impact sensing sensor is configured to sense an impact applied to one of the car or the screen, and
the display controller is further configured to increase the transmittance of the screen, based on the sensed impact.

14. The information processing system according to claim 12, wherein
the mobile object is a car,
the screen is between a front seat of the car and a rear seat of the car,
the specific sensor is a camera,
the camera is configured to:
capture an image associated with a driver on a driver seat; and
sense a not-gazing state of the driver, and
the display controller is further configured to increase the transmittance of the screen, based on the not-gazing state of the driver.

15. The information processing system according to claim 1, wherein
the mobile object is a car,
the screen is between a front seat of the car and a rear seat of the car,
the sensor unit further includes a specific sensor,
the specific sensor is configured to sense a not-gazing state of a driver, the acquisition unit is further configured to:
    acquire a result of detection by the specific sensor in one of the mobile object or on the screen; and
    acquire a video see-through image on a side of the front seat, and
the display controller is further configured to project the video see-through image on an area outside a display area onto which the content is projected on the screen, based on the not-gazing state of the driver during the projection of the content onto the screen.

* * * * *